United States Patent
Uehara et al.

(10) Patent No.: US 8,951,456 B2
(45) Date of Patent: Feb. 10, 2015

(54) METHOD FOR PRODUCING ULTRA-HIGH-MOLECULAR-WEIGHT POLYETHYLENE POROUS MEMBRANE, METHOD FOR PRODUCING ULTRA-HIGH-MOLECULAR-WEIGHT POLYTHEYLENE FILM, AND POROUS MEMBRANE AND FILM OBTAINED BY THESE METHODS

(75) Inventors: Hiroki Uehara, Kiryu (JP); Takeshi Yamanobe, Kiryu (JP)

(73) Assignee: National University Corporation Gunma University, Gunma (JP)

( * ) Notice: Subject to any disclaimer, the term of this patent is extended or adjusted under 35 U.S.C. 154(b) by 0 days.

(21) Appl. No.: 13/819,406

(22) PCT Filed: Aug. 31, 2011

(86) PCT No.: PCT/JP2011/069837
§ 371 (c)(1),
(2), (4) Date: Feb. 27, 2013

(87) PCT Pub. No.: WO2012/029881
PCT Pub. Date: Mar. 8, 2012

(65) Prior Publication Data
US 2013/0157035 A1    Jun. 20, 2013

(30) Foreign Application Priority Data

Aug. 31, 2010   (JP) .................................. 2010-194264

(51) Int. Cl.
    *B29C 67/00*          (2006.01)
    *B29D 7/01*            (2006.01)
    (Continued)

(52) U.S. Cl.
    CPC ................ *B29D 7/01* (2013.01); *B29C 55/005* (2013.01); *B29C 55/143* (2013.01); *B29C 55/18* (2013.01); *C08J 5/18* (2013.01);
    (Continued)

(58) Field of Classification Search
CPC ............................ B29C 55/12; B29C 47/0057
USPC ............................ 264/210.7, 210.1; 429/129
See application file for complete search history.

(56) References Cited

U.S. PATENT DOCUMENTS 6,676,871 B1 *   1/2004   Benassi et al. ................. 264/154
2008/0096102 A1 *   4/2008   Hatayama et al. ............. 429/122

FOREIGN PATENT DOCUMENTS

JP          04-091926 A     3/1992
JP    2000309020 A   11/2000
(Continued)

*Primary Examiner* — Galen Hauth
(74) *Attorney, Agent, or Firm* — Wilmer Cutler Pickering Hale and Dorr LLP

(57) ABSTRACT

A method for producing an ultra-high-molecular-weight polyethylene porous membrane, including: a step of molding a film using an ultra-high-molecular-weight polyethylene raw material; a step of biaxially stretching the obtained film in X-axis and Y-axis directions at a temperature of from a melting point of the film to 180° C.; and a pore-forming step of stretching the stretched film along at least one axis of the X-axis and Y-axis at from 142° C. to 170° C. Alternatively, a method for producing an ultra-high-molecular-weight polyethylene film, including: a step of molding a film by two steps of press-molding and roll-molding using an ultra-high-molecular-weight polyethylene raw material; and a step of biaxially stretching the film obtained in the above step, in X-axis and Y-axis directions at a temperature of from a melting point of the film to 180° C.

7 Claims, 11 Drawing Sheets

(51) Int. Cl.
  *B29C 55/00* (2006.01)
  *B29C 55/14* (2006.01)
  *B29C 55/18* (2006.01)
  *C08J 5/18* (2006.01)
  *B29K 23/00* (2006.01)
  *B29K 105/04* (2006.01)

(52) U.S. Cl.
  CPC .... *B29K 2023/0683* (2013.01); *B29K 2105/04* (2013.01); *C08J 2323/06* (2013.01)
  USPC ............... 264/210.7; 264/210.1; 429/129

(56) References Cited

FOREIGN PATENT DOCUMENTS

| | | |
|---|---|---|
| JP | 2003165155 A | 6/2003 |
| JP | 2004182763 A | 7/2004 |
| JP | 2009249477 A | 10/2009 |
| JP | 2009249480 A | 10/2009 |
| JP | 2010007053 A | 1/2010 |
| WO | WO-2004024809 A1 | 3/2004 |
| WO | WO-2009153318 A1 | 12/2009 |
| WO | WO-2010101214 A1 | 9/2010 |

* cited by examiner

FIG.7
(A)
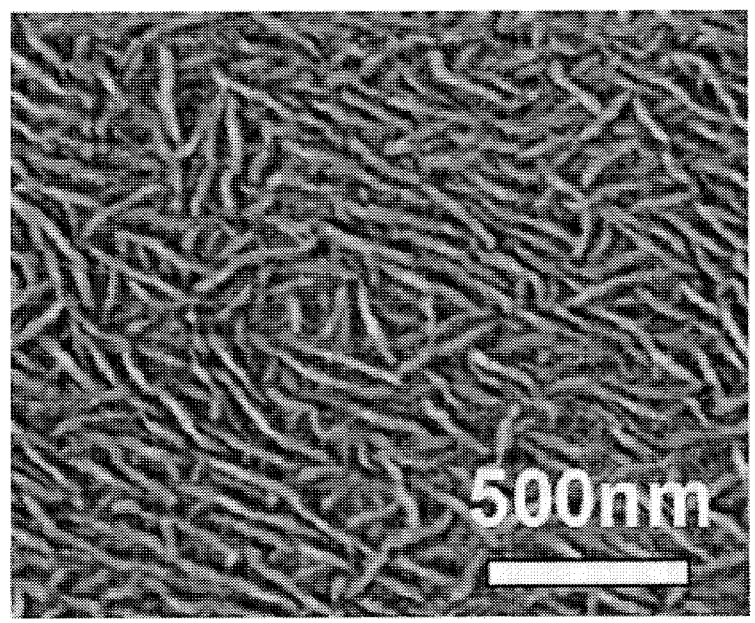
(B)
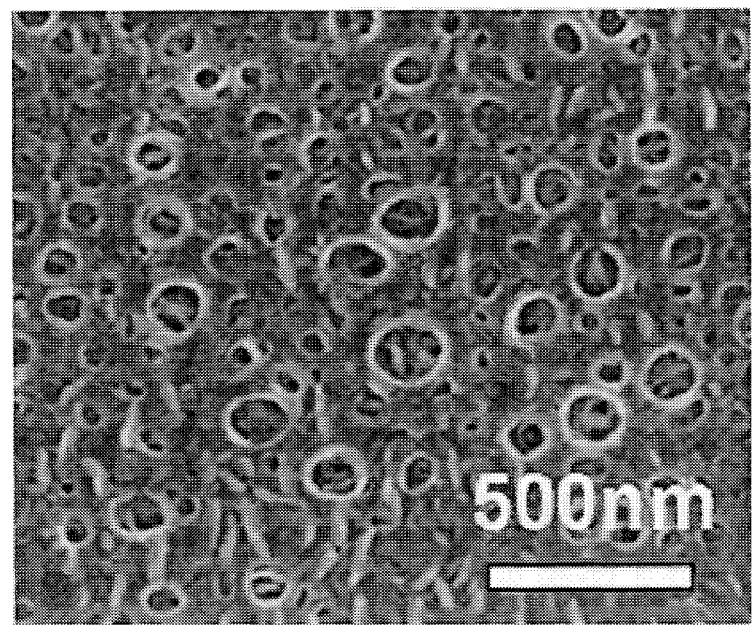

FIG.9
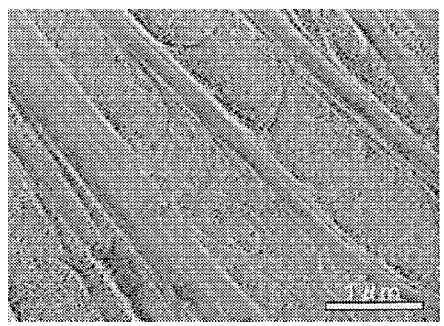 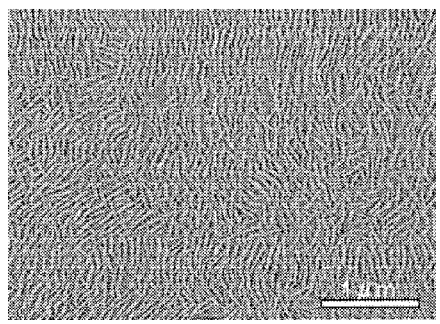
(A) (B)

FIG.10
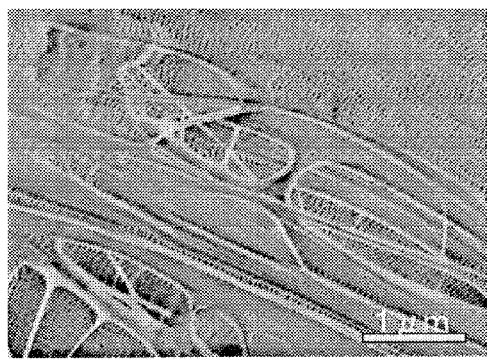
(A)
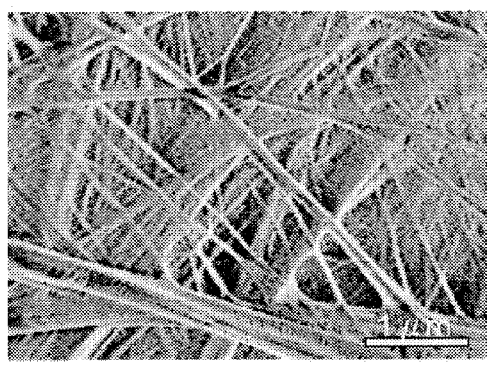
(B)
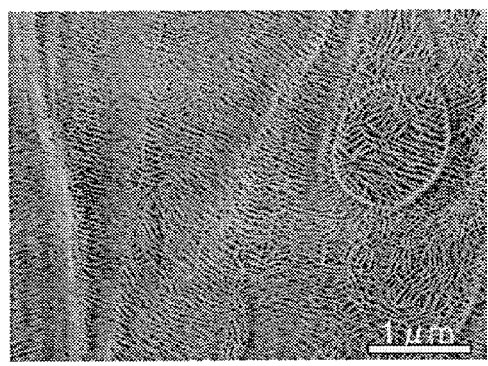
(C)

METHOD FOR PRODUCING ULTRA-HIGH-MOLECULAR-WEIGHT POLYETHYLENE POROUS MEMBRANE, METHOD FOR PRODUCING ULTRA-HIGH-MOLECULAR-WEIGHT POLYTHEYLENE FILM, AND POROUS MEMBRANE AND FILM OBTAINED BY THESE METHODS

TECHNICAL FIELD

The present invention relates to a method for efficiently producing an ultra-high-molecular-weight polyethylene porous membrane which has high gas permeability and can be applied to a lithium ion battery separator.

In addition, the present invention relates to a method for efficiently producing an ultra-high-molecular-weight polyethylene film at low cost which has high tensile strength at break and high tear strength, superior uniformity, and a thin thickness.

Furthermore, the present invention relates to an ultra-high-molecular-weight polyethylene porous membrane or an ultra-high-molecular-weight polyethylene film obtained by the above-described methods.

BACKGROUND ART

An ultra-high-molecular-weight polyethylene porous membrane is used as a lithium ion battery separator or the like, and the pore-forming treatment is performed by volatilizing and removing the pre-impregnated organic solvent (Japanese Patent Application Laid-Open (JP-A) No. 2004-182763). Due to this organic solvent, there are concerns regarding the health problems of the workers in the production field, and there are problems regarding environmental load caused by discharging the organic solvent into the atmosphere. Therefore, a low-environmental-loading process for producing an ultra-high-molecular-weight polyethylene porous membrane without using such an organic solvent is required.

In addition, it is reported that pores are formed by stretching (JP-A No. 2009-249480), and the present inventors have also filed the application which discloses that pores are formed by stretching (International Application No. PCT/JP2010/053543). In the methods of the related art, pores are formed by stretching at a temperature of a melting point of polyethylene or lower and there is room for improvement in pore-forming efficiency.

For use in the above-described lithium ion battery separator, the thinner the membrane thickness (film thickness), the higher the output because more battery cells can be stacked. Therefore, a reduction in the thickness of an ultra-high-molecular-weight polyethylene film is desired. When an organic solvent is used, for example, JP-A No. 2004-182763 discloses that an ultra-high-molecular-weight polyethylene film is produced through kneading and extrusion steps. However, when an organic solvent is not used, it is difficult to stably mold a film due to a high melt viscosity of an ultra-high-molecular-weight polyethylene. Therefore, as a method for producing an ultra-high-molecular-weight polyethylene film without using an organic solvent, a skiving method which molds powder of ultra-high-molecular-weight polyethylene into a block shape in advance and skives it into a thin-layer film is industrially used (for example, JP-A No. 4-91926). However, the thickness of a film obtained in this method is greater than or equal to 150 μm, and thus it is difficult to obtain a thin-layer film in this method.

In International Application PCT/JP2010/053543, the present inventors disclose that polyethylene is molded, stretched, and shrunk to obtain a film without using any organic solvent, and that pores are formed in this film to form a porous membrane, and state that roll-molding or press-molding is applicable to the molding of polyethylene. In addition, JP-A No. 2003-165155 discloses that roll-molding can be applied to the molding of polyethylene without using any organic solvent. However, there is room for improvement for providing a thin-layer film having high strength and a superior gas barrier property or a porous membrane having superior ion permeability made from an ultra-high-molecular-weight polyethylene.

SUMMARY OF INVENTION

Technical Problem

An object of the present invention is to provide a method for efficiently producing an ultra-high-molecular-weight polyethylene porous membrane which has high gas permeability and can be applied to a lithium ion battery separator.

Another object of the present invention is to provide a method for efficiently producing an ultra-high-molecular-weight polyethylene film at low cost which has high tensile strength at break and high tear strength, superior uniformity, and a thin thickness.

Still another object of the present invention is to provide an ultra-high-molecular-weight polyethylene porous membrane or an ultra-high-molecular-weight polyethylene film obtained using the above-described methods.

Solution to Problem

In order to achieve the above-described objects, the present inventors have thoroughly studied, and as a result, have found that an ultra-high-molecular-weight polyethylene porous membrane having superior gas permeability can be produced by biaxially stretching a film molded using an ultra-high-molecular-weight polyethylene as a raw material, in X-axis and Y-axis directions at a temperature of higher than a melting point thereof, and then forming pores at 142° C. to 170° C.

In addition, the present inventors have found that, when an ultra-high-molecular-weight polyethylene film is produced, a film having high film strength, a high gas barrier property, and a thin thickness can be efficiently produced by performing both roll-molding and press-molding to mold a film and then biaxially stretching the film, and have completed the invention.

That is, the first invention to achieve the above-described objects is as follows.

(1) A method for producing an ultra-high-molecular-weight polyethylene porous membrane, comprising:
a step of molding a film using an ultra-high-molecular-weight polyethylene raw material having a viscosity average molecular weight of from 1,000,000 to 12,000,000;
a step of biaxially stretching the film obtained in the above step, in X-axis and Y-axis directions in a temperature range of from a melting point of the film to 180° C.;
a step of shrinking the biaxially stretched film obtained in the above step, along at least one axis of the X-axis or Y-axis; and
a pore-forming step of stretching the shrunk film obtained in the above step, along at least one axis of the X-axis or Y-axis in a temperature range of from 142° C. to 170° C.

(2) The method for producing an ultra-high-molecular-weight polyethylene porous membrane according to (1), wherein the step of shrinking is performed in a temperature range of from 120° C. to 180° C.

(3) The method for producing an ultra-high-molecular-weight polyethylene porous membrane according to (1) or (2), further comprising a step of annealing the film at a temperature of from 80° C. to 180° C. after the step of biaxially stretching or the step of shrinking.

(4) The method for producing an ultra-high-molecular-weight polyethylene porous membrane according to any one of (1) to (3), comprising a step of cooling the film to a temperature that is lower than a final temperature in a previous step by from 10° C. to 160° C., before the pore-forming step but after the step of biaxially stretching, the step of shrinking, or the step of annealing.

(5) The method for producing an ultra-high-molecular-weight polyethylene porous membrane according to any one of (1) to (4), wherein at least one step of the step of biaxially stretching, the step of shrinking, the step of annealing, the step of cooling, or the pore-forming step is performed a plurality of times in any order of the steps.

(6) An ultra-high-molecular-weight polyethylene porous membrane obtained by the production method according to any one of (1) to (5).

It is preferable that the above-described molding step includes both a press-molding step and a roll-molding step. It is more preferable that a plurality of the films obtained in the roll-molding step are stacked, and then the press-molding step is performed.

Further, it is preferable that the obtained polyethylene porous membrane has an oxygen permeability coefficient, measured at room temperature, of greater than or equal to $5 \times 10^{-10}$ cm$^3$(STP)cm/(cm$^2 \cdot$s$\cdot$cmHg). Such a polyethylene porous membrane is useful as, for example, a lithium ion battery separator.

The second invention to achieve the above-described objects is as follows.

(7) A method for producing an ultra-high-molecular-weight polyethylene film, comprising:

a film-molding step of molding a film by performing at least two steps of a press-molding step and a roll-molding step, using an ultra-high-molecular-weight polyethylene raw material having a viscosity average molecular weight of from 1,000,000 to 12,000,000; and a step of biaxially stretching the film obtained in the above step, in X-axis and Y-axis directions in a temperature range of from a melting point of the film to 180° C.

(8) The method for producing an ultra-high-molecular-weight polyethylene film according to (7), wherein the film-molding step includes, in this order:

a roll-molding step of roll-molding an ultra-high-molecular-weight polyethylene raw material having a viscosity average molecular weight of from 1,000,000 to 12,000,000 to mold a film; and a press-molding step of stacking a plurality of the films obtained in the roll-molding step, and then press-molding the plurality of the films.

(9) The method for producing an ultra-high-molecular-weight polyethylene film according to (8), wherein, in the press-molding step, the plurality of the films obtained in the roll-molding step are stacked so as to have roll-molded directions different from each other.

(10) The method for producing an ultra-high-molecular-weight polyethylene film according to any one of (7) to (9), comprising, after the step of biaxially stretching, a step of shrinking the biaxially stretched film obtained in the above step, along at least one axis of the X-axis or Y-axis.

(11) The method for producing an ultra-high-molecular-weight polyethylene film according to (10), wherein the step of shrinking is performed in a temperature range of from 120° C. to 180° C.

(12) The method for producing an ultra-high-molecular-weight polyethylene film according to any one of (7) to (11), further comprising a step of annealing the film in a temperature range of from 80° C. to 180° C. after the step of biaxially stretching or the step of shrinking.

(13) The method for producing an ultra-high-molecular-weight polyethylene film according to any one of (7) to (12), wherein at least one step of the step of biaxially stretching, the step of shrinking, or the step of annealing is performed a plurality of times in any order of the steps.

(14) The method for producing an ultra-high-molecular-weight polyethylene film according to any one of (7) to (13), further comprising a pore-forming step of stretching the film along at least one axis of the X-axis or the Y-axis to obtain a porous membrane, after the step of biaxially stretching, the step of shrinking, or the step of annealing.

(15) An ultra-high-molecular-weight polyethylene film obtained by the production method according to any one of (7) to (13), having:

a film thickness of from 0.1 μm to 100 μm;

an oxygen permeability coefficient, measured at room temperature, of less than or equal to $\times 10^{-10}$ cm$^3$(STP)cm/(cm$^2 \cdot$s$\cdot$cmHg); and a strength at break of greater than or equal to 30 MPa.

Advantageous Effects of Invention

According to the first invention, an ultra-high-molecular-weight polyethylene porous membrane having high uniformity and high gas permeability can be easily produced at low cost.

According to the second invention, an ultra-high-molecular-weight polyethylene film, which has high tensile strength at break, high tear strength, and high uniformity (high crystallinity) and can be applied to a variety of fields, can be efficiently provided at low cost.

A numerical value range represented using "to" in this specification is a range including a lower limit and an upper limit of numerical values described before and after "to".

In addition, room temperature described in this specification represents 20° C.

Figure 4:
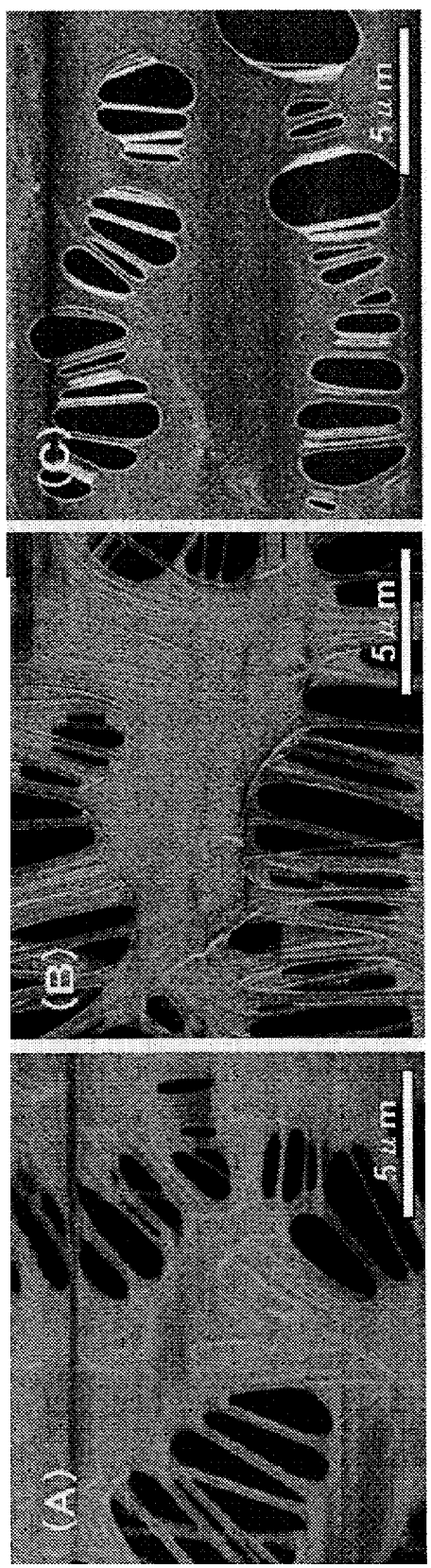

(A) of FIG. 4 is a scanning electron microscopic image of an ultra-high-molecular-weight polyethylene porous membrane obtained in Example 2-2; (B) of FIG. 4 is a scanning electron microscopic image of an ultra-high-molecular-weight polyethylene porous membrane obtained in Example 2-3; and (C) of FIG. 4 is a scanning electron microscopic image of an ultra-high-molecular-weight polyethylene porous membrane obtained in Example 3-2.

Figure 5:
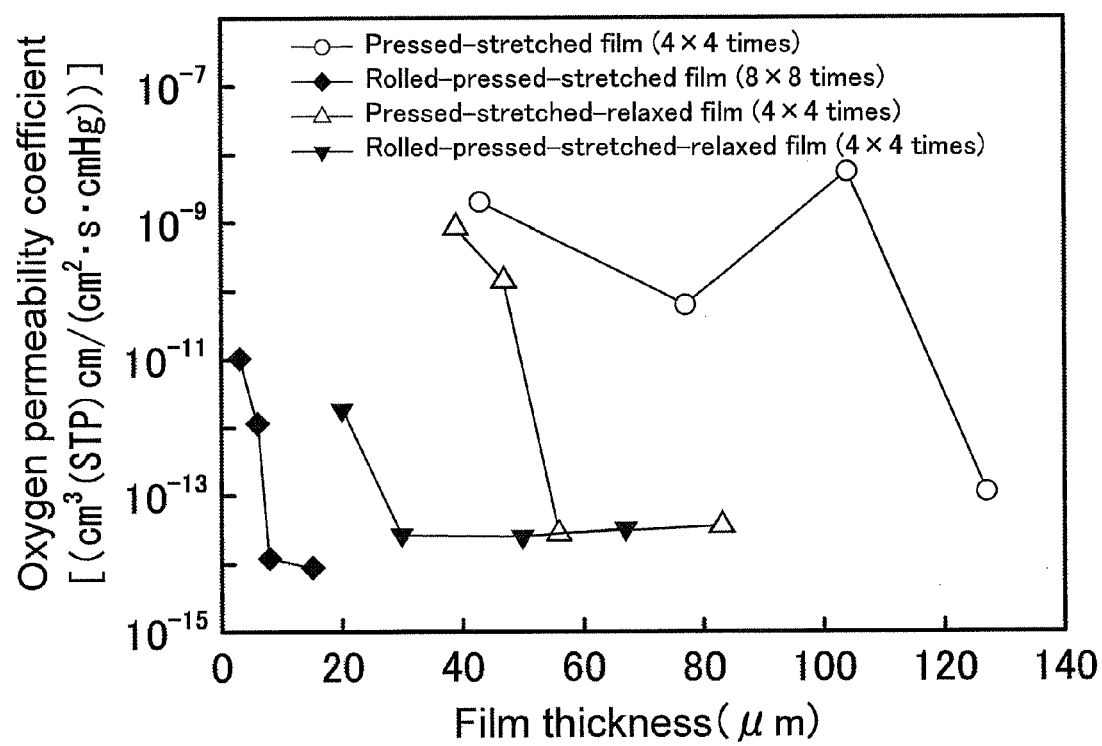

FIG. 5 is a graph illustrating the relationship between a film thickness and an oxygen permeability coefficient regarding ultra-high-molecular-weight polyethylene films of Example 4-1 and Comparative Example 1 which are obtained by performing press-molding, or both roll-molding and press-molding; and then performing a stretching treatment or both a stretching treatment and a relaxing treatment.

Figure 6:
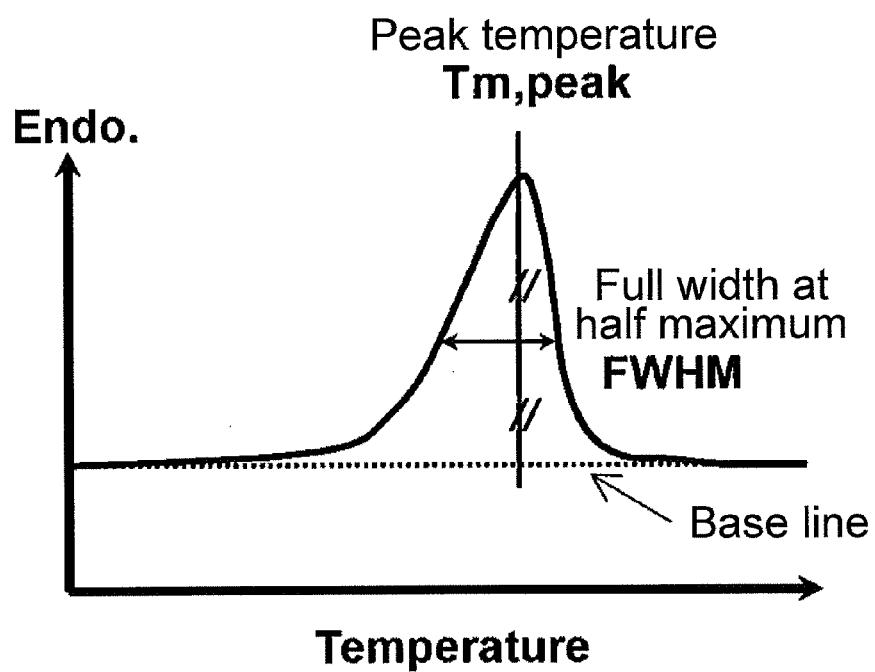

FIG. 6 is a diagram illustrating a method for calculating a full width at half maximum (FWHM) based on a melting curve which is obtained by the measurement using a differential scanning calorimeter (DSC).

(A) of FIG. 7 is a scanning electron microscopic image of a rolled-pressed-stretched-relaxed film obtained in Example 4-1; and (B) of FIG. 7 is a scanning electron microscopic image of a porous membrane subjected to a pore-forming treatment at 120° C.

Figure 8:
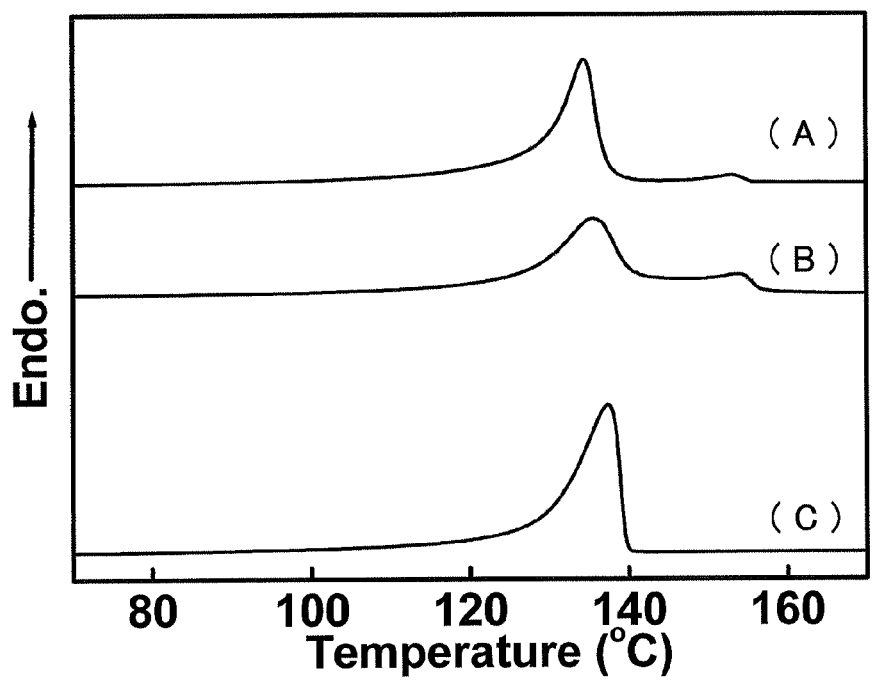

FIG. 8 is a diagram illustrating melting curves obtained by the DSC measurement regarding a rolled-pressed-stretched-relaxed film [Graph (A)], a rolled-pressed-stretched film [Graph (B)], and an unstretched rolled-pressed film [Graph (C)] which are obtained in Example 4-2.

(A) of FIG. 9 is an SEM image of a rolled-pressed-stretched film with a stretch ratio of 14×14 times obtained in Example 4-2; and (B) of FIG. 9 is an SEM image of a rolled-pressed-stretched-relaxed film with a stretch ratio of 6×6 times obtained in Example 4-2.

(A) of FIG. 10 is an SEM image of a pressed-stretched film with a stretch ratio of 4×4 times obtained in Comparative Example 1; (B) of FIG. 10 is an SEM image of a pressed-stretched film with a stretch ratio of 8×8 times obtained in the same manner as Comparative Example 1; and (C) of FIG. 10 is an SEM image of a pressed-stretched-relaxed film with a stretch ratio of 4×4 times obtained in Comparative Example 1.

Figure 11:
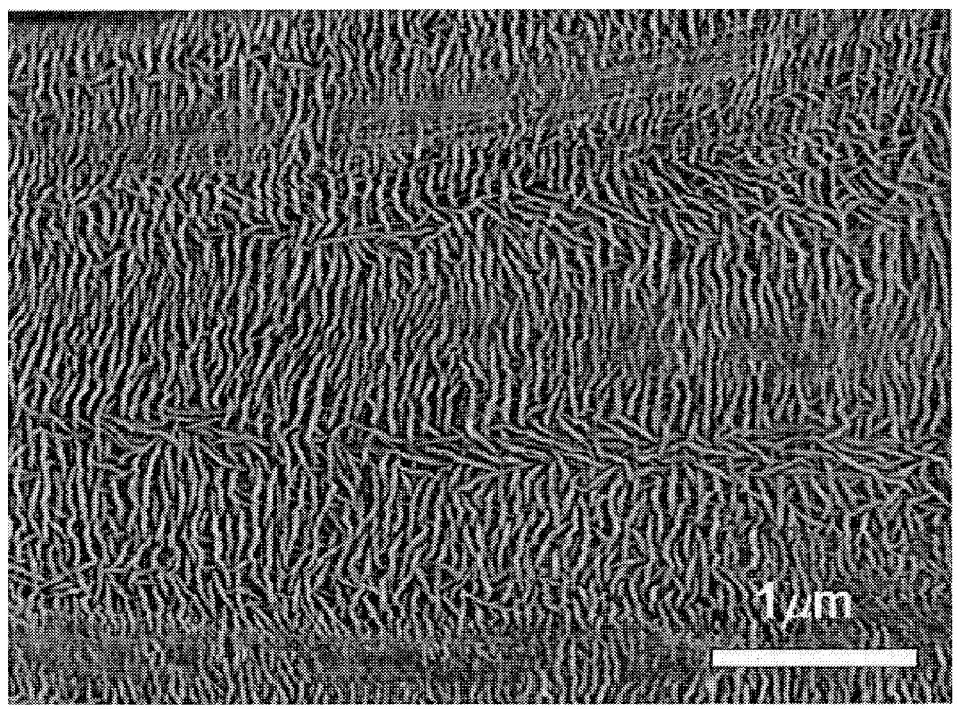

FIG. 11 is a scanning electron microscopic image of a film in Example 6-1 (total stretch ratio: 6×4 times), which is obtained by roll-molding and press-molding into a film, simultaneously biaxially stretching the film at 150° C. to 7×7 times in the longitudinal and transverse directions; shrinking the film at 150° C. to 4×4 times in the longitudinal and transverse directions; and finally stretching the film at 150° C. by 1.5 times only in the longitudinal direction.

DESCRIPTION OF EMBODIMENTS

First Invention

Method for Producing Ultra-High-Molecular-Weight Polyethylene Porous Membrane The first invention relates to a method for producing an ultra-high-molecular-weight polyethylene porous membrane including: a step of molding a film using an ultra-high-molecular-weight polyethylene raw material; a step of biaxially stretching the film obtained in the above step, in X-axis and Y-axis directions in a temperature range of from a melting point of the film to 180° C.; a step of shrinking after the step of biaxially stretching; and a pore-forming step, in which the pore-forming treatment is performed in a temperature range of from 142° C. to 170° C.

In the method for producing an ultra-high-molecular-weight polyethylene porous membrane according to the invention, firstly, a film is molded using an ultra-high-molecular-weight polyethylene as a raw material.

As the ultra-high-molecular-weight polyethylene raw material used for molding a film, a polyethylene having a viscosity average molecular weight (Mv) of 1,000,000 to 12,000,000 is preferable and polyethylene having a viscosity average molecular weight (Mv) of 1,200,000 to 6,000,000 is more preferable. The viscosity average molecular weight described herein is a value measured in a decalin solvent (135° C.), and the intrinsic viscosity ($[\eta]$) is preferably 5 dl/g to 50 dl/g, more preferably 8 dl/g to 40 dl/g, and still more preferably 10 dl/g to 30 dl/g.

For the ultra-high-molecular-weight polyethylene, it is known that the viscosity average molecular weight and the intrinsic viscosity have the relationship, represented by the following expression as described in JP-A No. 2005-314544 and JP-A No. 2005-313391.

$$Mv = 5.37 \times 10^4 [\eta]^{1.49}$$

Using the above-described expression, the viscosity average molecular weight can be obtained from the measured intrinsic viscosity and the invention adopts values obtained in this way.

The molecular weight of the ultra-high-molecular-weight polyethylene is measured as described above. However, when the dissolution in the solvent of decalin is difficult, the molecular weight of an ultra-high-molecular-weight polyethylene which is preferable in the present invention is measured using the following method. This method is applied according to ASTM D 1430-65T. First, an ultra-high-molecular-weight polyethylene is molded into a film and a yield value thereof is measured to calculate the molecular weight.

An ultra-high-molecular-weight polyethylene raw material, which is subjected to measurement of the molecular weight, is molded into a film by melt-press molding, and a dumbbell-shaped specimen defined by ASTM D 1430-65T is prepared from the film. Plural dumbbell-shaped specimens are prepared and different loads are applied thereto, followed by dipping in a glycol bath heated to 150° C. The specimens are stretched by the applied loads, and a time required for being stretched by 600% is measured. The above-described time required for the stretching is plotted on a logarithmic coordinate axis with respect to the tensile stress applied to the specimens (values obtained by dividing the loads by the cross-sectional areas of the specimens). The plotted values show linearity, and the stress ($N/mm^2$) required for a stretch time of 10 minutes, which is called the yield value, is calculated from the graph. Regarding the ultra-high-molecular-weight polyethylene used in the present invention, it is preferable that the yield value is within a range of from 0.05 $N/mm^2$ to 1.5 $N/mm^2$. For example, according to documents such as Ultra-High-Molecular-Weight Polyethylene (PE-UHMW) Hostalene GUR Catalog (Hoechst Aktiengesellschaft, August 1993), the yield value is correlated with the viscosity average molecular weight, which is measured using the above-described viscosity method. Therefore, the molecular weight can be determined using the yield value measurement method.

The shape of an ultra-high-molecular-weight polyethylene raw material which is used for molding a film is not particularly limited, but a granular or powdered ultra-high-molecular-weight polyethylene is preferable and a powdered ultra-high-molecular-weight polyethylene is more preferable. Regarding the particle diameter of the powdered ultra-high-molecular-weight polyethylene, the volume average particle diameter ($D_{50}$) is preferably less than or equal to 2,000 μm, more preferably 1 μm to 2,000 μm, and still more preferably 10 μm to 1,000 μm.

Any ultra-high-molecular-weight polyethylene can be used which is a polymer polymerized using a known catalyst, but an ultra-high-molecular-weight polyethylene, which is polymerized using a Ziegler or metallocene catalyst, is preferably used. In addition, when a film is molded, other components such as a solvent or silica may be added in addition to the ultra-high-molecular-weight polyethylene raw material.

In addition, examples of compounds which can be added when a film is molded include known additives, such as compounding agents that may be added to and mixed with polyolefin, such as a plasticizer, an antioxidant, a light stabilizer, an ultraviolet absorber, a thermal stabilizer, a lubricant, a mould releasing agent, an antistatic agent, a flame retardant, a foaming agent, a filler, an antibacterial or antifungal agent, a nucleating agent, and colorants including dyes and pigments. One kind or two or more kinds thereof can be added according to the purpose within a range not impairing the objects of the present invention.

Among these, as the antioxidant, phenol-based antioxidants such as IRGANOX 1076 (trade name) manufactured by Ciba-Geigy K.K., phosphorus-based antioxidants such as ADEKASTAB HP-10 (trade name) manufactured by Asahi Denka Kogyo K.K., or sulfur-based antioxidants are preferably used.

Examples of a method for adding these additives include a method of mixing the additives with the raw material as they are, and known addition methods such as a method of dispersing or dissolving the additives in another solvent, mixing or spraying it into the raw material, and volatizing and removing only the solvent; and a method of kneading the additives in a state where the ultra-high-molecular-weight polyethylene raw material is melted.

In addition, it is preferable that the ultra-high-molecular-weight polyethylene contain only ethylene as a constitutional unit from the viewpoints of superior physical properties such as high crystallinity and high strength. However, the ultra-high-molecular-weight polyethylene may be a polymer or a copolymer containing a constitutional unit derived from ethylene. When the ultra-high-molecular-weight polyethylene is a copolymer, examples of a constitutional unit, which constitutes the ultra-high-molecular-weight polyethylene together with a constitutional unit of ethylene, include constitutional units derived from α-olefins such as propylene, 1-butene, 1-hexene, 1-octene, and 4-methyl-1-pentene. That is, "the ultra-high-molecular-weight polyethylene porous membrane" and "the ultra-high-molecular-weight polyethylene film" according to the invention may include those obtained using a polyethylene copolymer as a raw material.

A method for molding a film from the ultra-high-molecular-weight polyethylene is not particularly limited, and examples thereof include press-molding, roll-molding, kneading and extrusion molding, a skiving method, and inflation molding. Among these, press-molding and roll-molding are more preferable.

Roll-molding is described in JP-A No. 2003-165155. As the roll-molding, a method of causing polyethylene polymer powder to pass through a gap between a pair of rolls to mold a film is preferable. During roll-molding, the gap between the rolls is preferably 0.005 mm to 10 mm, more preferably 0.005 mm to 0.1 mm, and still more preferably 0.005 mm to 0.05 mm, from the viewpoints of the uniformity and thinning of the obtained polyethylene film. The rotating speed of the rolls during roll-molding is preferably 0.1 m/min to 10 m/min and more preferably 1 m/min to 10 m/min from the viewpoints of superior adhesion of the polyethylene polymer powder and superior transparency, uniformity, and mechanical properties such as strength at break of the obtained polyethylene film.

The shape of the rolls for roll-molding is not particularly limited as long as it is a rotatable shape, and examples thereof include a cylindrical shape, a columnar shape, and a rotatable endless belt shape. In addition, the material of the rolls is not limited as long as the roll-molding of the polyethylene polymer powder can be desirably performed, and examples thereof include metals such as stainless steel, fluororesins such as polytetrafluoroethylene, and polyimide resins. Among these, stainless steel or the like is preferable from the viewpoints of performing the roll-molding of the polyethylene polymer powder more desirably.

Roll-molding is performed preferably at a temperature of higher than a melting point of the ultra-high-molecular-weight polyethylene (powder or film) to be subjected to the molding, more preferably at a temperature of 120° C. to 180° C., and still more preferably at a temperature of 136° C. to 180° C.

Meanwhile, press-molding is performed preferably at a pressure of 0.01 MPa to 100 MPa, more preferably at a pressure of 0.01 MPa to 50 MPa, and still morel preferably at a pressure of 0.1 MPa to 10 MPa.

In the method for producing an ultra-high-molecular-weight polyethylene porous membrane according to the present invention, it is preferable that either roll-molding or press-molding described above is performed and it is more preferable that both roll-molding and press-molding are performed. In this case, any one of roll-molding and press-molding may be performed first, and roll-molding and press-molding may be repeated. However, as described below in the examples of the present application, a method is preferable in which roll-molding is performed to mold a film; the film is cut into plural sheets of films; and the films are stacked so as to have rolled directions different from each other, and then press-molded. A method is more preferable in which the films are stacked so as to have rolled directions perpendicular to each other, and then press-molded. As a result, more uniform film can be molded.

When a film is molded, the roll-molding or press-molding of an ultra-high-molecular-weight polyethylene powder as a raw material is performed preferably at a temperature of higher than a melting point of the ultra-high-molecular-weight polyethylene and more specifically at a temperature of 120° C. to 250° C. When roll-molding is performed first and then press-molding is performed, it is preferable that roll-molding is performed in a temperature range of from 120° C. to 180° C. and press-molding is performed in a temperature range of from 130° C. to 250° C. "The melting point" described in the present invention represents a temperature at a peak of a DSC curve which is measured and obtained by a differential scanning calorimeter (DSC); and is about 120° C. to 145° C. although it varies depending on the production method and the molecular weight of the ultra-high-molecular-weight polyethylene (powder or film). When there are plural melting peaks, a temperature at a peak having the maximum intensity (endothermic energy amount) is referred to as the melting point.

Next, in the method for producing an ultra-high-molecular-weight polyethylene porous membrane according to the present invention, the molded polyethylene film is biaxially stretched in X-axis and Y-axis directions at a temperature of a melting point thereof or higher. As the biaxial stretching, sequential biaxial stretching, in which the film is stretched in one direction (X-axis) and then is stretched in a direction (Y-axis) perpendicular to the previous direction, may be performed, but simultaneous biaxial stretching in which the film is simultaneously stretched in X-axis and Y-axis directions (longitudinal and transverse directions) is preferable.

In the biaxial stretching treatment, the temperature range is greater than or equal to a melting point of the ultra-high-molecular-weight polyethylene film and less than or equal to 180° C., and is preferably 120° C. to 180° C., more preferably 130° C. to 180° C., still more preferably 136° C. to 180° C., and most preferably 136° C. to 170° C. The temperature may be changed during the biaxial stretching treatment within the above-described temperature range.

The temperature conditions in the biaxial stretching treatment may be appropriately selected according to the molecular weight of the ultra-high-molecular-weight polyethylene film. For example, when the molecular weight is in the vicinity of 1,000,000, it is preferable that the temperature is 136° C. to 145° C. in the vicinity of the melting point. However, as the molecular weight becomes higher, the biaxial stretching step can be performed at a higher temperature because the thermal characteristics of the film are changed.

It is preferable that the stretch ratio in the biaxial stretching treatment is 2 times to 50 times the length before stretching in the X-axis and Y-axis directions. The stretch ratios in the X-axis and Y-axis directions may be the same as or different from each other.

In addition, before the biaxial stretching treatment, a maintaining step of maintaining the film at the temperature for performing biaxial stretching for a predetermined time may be provided. At this time, the time for which the temperature is maintained is preferably 1 minute to 180 minutes and more preferably 1 minute to 10 minutes.

In order to efficiently perform biaxial stretching in a state where the film is melted, it is preferable that stretching is performed in a state where only the center of the film is melted and chuck portions (film end portions) are not melted using a biaxial stretching machine equipped with a hot-air blower. At this time, in order to confirm that biaxial stretching is performed in a state where the film is melted, it is preferable that a biaxial stretching machine provided with a stress detection mechanism is used. In addition, the thickness of the chuck portions (film end portions) become gradually thinner and the film is likely to slip along with the progress of stretching. Therefore, it is preferable that a chuck mechanism such as an air chuck mechanism in which a constant holding force is applied is provided.

In the method for producing an ultra-high-molecular-weight polyethylene porous membrane according to the present invention, a shrinking treatment (returning treatment) is performed along at least one axis of the X-axis or Y-axis after performing biaxial stretching. The shrinking treatment may be performed immediately after performing biaxial stretching. Or, the shrinking treatment may be performed after maintaining the film at the temperature for performing the shrinking treatment for a predetermined time (preferably for 1 minute to 180 minutes and more preferably for 1 minute to 10 minutes) after performing biaxial stretching. The temperature of the shrinking treatment is preferably 120° C. to 180° C., more preferably 130° C. to 180° C., still more preferably 136° C. to 180° C., and most preferably 136° C. to 170° C. The temperature may be changed during the shrinking treatment within the above-described temperature range.

When the shrinking treatment is performed along both of the X-axis and Y-axis, first, shrinking may be performed in one direction, and then shrinking may be performed in a direction perpendicular to the direction. However, it is preferable that shrinking is performed in both the X-axis and Y-axis directions at the same time.

The shrinkage ratio is set such that the length after shrinking is preferably 5% to 95% and more preferably 20% to 75% of the length before shrinking (the length after stretching) in the X-axis and Y-axis directions. The shrinkage ratios in the X-axis and Y-axis directions may be the same as or different from each other.

In addition, before the shrinking treatment, a maintaining step of maintaining the film at the temperature for performing the shrinking treatment for a predetermined time may be provided. At this time, the time for which the temperature is maintained is preferably 1 minute to 180 minutes and more preferably 1 minute to 10 minutes. In this case, the length before shrinking represents a length after the maintaining step at a specific temperature after the stretching step.

Furthermore, an annealing treatment step of performing annealing treatment may be provided before or after the shrinking treatment. The annealing treatment temperature is preferably 80° C. to 180° C. and more preferably 120° C. to 165° C. The annealing treatment time is preferably 1 minute to 180 minutes and more preferably 1 minute to 10 minutes. The temperature may be changed during the annealing treatment within the above-describe temperature range.

In the method for producing ultra-high-molecular-weight polyethylene porous membrane according to the present invention, a restretching treatment may be performed along at least one axis of the X-axis or Y-axis. The restretching treatment may be performed immediately after the shrinking treatment, or the restretching treatment may be performed after performing the shrinking treatment and the above-described annealing treatment. Similarly to the case of the initial biaxial stretching treatment, the temperature of the restretching treatment may also be a temperature of higher than the melting point of the ultra-high-molecular-weight polyethylene film, but is preferably 120° C. to 180° C., more preferably 130° C. to 180° C., still more preferably 136° C. to 180° C., and most preferably 136° C. to 170° C. The temperature may be changed during the restretching treatment within the above-described temperature range. When the restretching treatment is performed along both the X-axis and the Y-axis, stretching may be performed in one direction first, and then stretching may be performed in a direction perpendicular to the previous direction, but it is preferable that stretching is performed in the X-axis and Y-axis directions at the same time. It is preferable that the stretch ratio in the restretching treatment is 1.1 times to 50 times the length before restretching in the X-axis and Y-axis directions. The stretch ratios in the X-axis and Y-axis directions may be the same as or different from each other. Due to the restretching treatment, the tensile strength at break can be further increased.

Before the restretching treatment, a maintaining step of maintaining the film at the stretching temperature for a predetermined time may be provided. At this time, the time for which the temperature is maintained is preferably 1 minute to 180 minutes and more preferably 1 minute to 10 minutes.

In addition, after such a restretching treatment, the above-described step of shrinking or step of annealing may be further performed. Furthermore, at least one step selected from the step of stretching, the step of shrinking, the step of annealing, or the step of restretching may be appropriately repeated. When the above-described respective treatment steps are repeated, the order and the number of times of the respective steps may be arbitrarily changed.

For example, when the annealing treatment step is performed before the step of shrinking and after the step of stretching, "the length before shrinking" in the shrinking treatment step represents the length after the annealing treatment step which is performed after the step of stretching.

In the method for producing ultra-high-molecular-weight polyethylene porous membrane according to the present invention, the obtained ultra-high-molecular-weight polyethylene film is subjected to a pore-forming treatment after these treatments. After the stretching treatment, the shrinking treatment, or the annealing treatment, it is preferable that the pore-forming treatment is performed after performing a cooling treatment of temporarily cooling the film to a temperature lower than or equal to the melting point of the ultra-high-molecular-weight polyethylene film or to a crystallization temperature or lower to establish (crystallize) a lamellar structure. The temperature for performing the pore-forming treatment is 142° C. to 170° C. and more preferably 145° C. to 165° C. By performing the pore-forming treatment within the above-described temperature range, the gas permeability of the porous membrane can be increased.

In addition, before the pore-forming treatment, a maintaining step of maintaining the film at the temperature for performing the pore-forming treatment for a predetermined time may be provided. At this time, the time for which the temperature is maintained is preferably 1 second to 1 hour and more preferably 1 minute to 10 minutes.

The pore-forming treatment can be performed by, for example, temporarily cooling the film obtained in the shrinking treatment, to a temperature lower than or equal to the melting point or to a crystallization temperature or lower to establish (crystallize) a lamellar structure; and uniaxially or biaxially stretching the film at 142° C. to 170° C. As a result, a porous membrane having a pore diameter of several tens of nm to several μm can be produced without using an organic solvent.

In the pore-forming treatment, uniaxial stretching or biaxial stretching may be performed. It is preferable that the stretch ratio is 1.1 times to 10.0 times the length before the pore-forming treatment in the X-axis and Y-axis directions. When biaxial stretching is performed, it is not necessary that stretching is performed at the same time. The stretch ratios in the X-axis and Y-axis directions may be the same as or different from each other. In addition, the temperature may be changed during the pore-forming treatment within the above-described temperature range. In addition, biaxial stretching may be either simultaneous biaxial stretching or sequential biaxial stretching.

In the present invention, it is preferable that a cooling treatment of temporarily cooling the film, which has been subjected to the biaxial stretching treatment and the shrinking treatment, to the melting point or lower or to a crystallization temperature or lower is performed before the pore-forming step and after the step of biaxially stretching, the step of shrinking, or the step of annealing. The cooling treatment is performed under conditions in which cooling is performed to a temperature that is lower than a final temperature in the previous step preferably by 10° C. to 160° C. and more preferably by 20° C. to 150° C. For example, when the stretching step is performed at a temperature range of 180° C. and cooling is performed to the vicinity of room temperature (20° C.), it is presumed that cooling is performed to a temperature which is lower than a final temperature of the previous step by about 160° C.

In this case, "the previous step" in the cooling treatment represents a step which is performed before the cooling treatment step; the previous step may be one selected from "the stretching treatment step", "the shrinking treatment step", and "the annealing treatment step"; and the cooling treatment step may be performed after all of these steps.

After the pore-forming treatment is performed, the stretching treatment, the shrinking treatment, the annealing treatment, the cooling treatment, and/or the pore-forming treatment may be appropriately repeated to a degree to which a porous structure is not damaged or blocked. When these treatments are repeated, the order and the number of times thereof may be arbitrarily changed. In addition, when the pore-forming treatment is repeated, it may be performed after the temperature is temporarily lowered to the melting temperature or lower or to the crystallization temperature or lower; or it may be performed while the pore-forming temperature is maintained without lowering the temperature.

As described above, when the pore-forming treatment is repeated, it is also preferable that the cooling treatment of cooling the film, which has been subjected to the pore-forming treatment, to the melting temperature or lower or to the crystallization temperature or lower, is performed. As cooling conditions, it is preferable that cooling is performed to a temperature which is lower than a final temperature of the previous step by 10° C. to 160° C.; and finally, it is preferable that cooling is performed to a temperature which is greater than or equal to 20° C. and less than 120° C. It is preferable that the cooling treatment is performed, heating is performed again to 142° C. to 170° C., and the pore-forming treatment is performed.

In the present invention, the polyethylene porous membrane, which is obtained by being subjected to such various treatment steps, is finally taken out at room temperature and is used for various applications.

The shape of pores included in the polyethylene porous membrane can be confirmed from a scanning electron microscopic (SEM) image or the like as described in the following examples. In addition, since the porous membrane according to the present invention includes fine passing-through pores, the oxygen permeability coefficient, measured at room temperature, is greater than or equal to $5 \times 10^{-10}$ cm$^3$(STP)cm/(cm$^2 \cdot$s$\cdot$cmHg); and the shape and density of the pores can be controlled under production conditions. With a method in which a solvent is not used such as the production method according to the present invention, a porous membrane having an oxygen permeability coefficient of $1 \times 10^{-9}$ cm$^3$(STP) cm/(cm$^2 \cdot$s$\cdot$cmHg) or greater can be produced.

In the polyethylene porous membrane according to the present invention, which is obtained using the production method according to the present invention, uniform and fine pores are formed in the ultra-high-molecular-weight polyethylene membrane having high strength and its ion permeability and gas permeability are superior. Therefore, the porous membrane is used for various applications. In particular, the porous membrane is effective for lithium ion battery separators.

In a method for producing a lithium ion battery separator of the related art, a film is molded; an organic solvent (for example, decalin or paraffin), which has been mixed into the film in advance, is volatized or removed by extraction to form pores; and this film is stretched to adjust the size of pores (JP-A No. 2004-182763). On the other hand, according to the present invention, a porous membrane having a pore diameter of several tens of nm to several μm can be produced without using a solvent. Therefore, it can be said that the production method according to the present invention is a method in which environmental load is small and the health of the production workers is not damaged.

A lithium ion battery has superior characteristics such as high operating voltage, high energy density, no memory effect, and long cycle life-time for discharge and charge and is widely used as a secondary battery for laptop type personal computers, digital cameras, video cameras, or mobile phones.

A basic structure of a lithium ion battery is configured to include at least a cathode which has a cathode active material and a cathode collector; an anode which has an anode active material and an anode collector; a separator; and an electrolytic solution. In general, the cathode and the anode sandwich the separator through which the electrolytic solution permeates. This assembly is sealed with an exterior material. Aluminum foil is used as the cathode collector, and copper foil is used as the anode collector. The separator requires superior ion conductivity in the electrolytic solution and high mechanical strength and thermal stability. Therefore, the porous membrane according to the present invention, which has higher uniformity, superior ion conductivity, and higher mechanical strength than those of a porous membrane of the related art obtained by removing a solvent, is preferable as the separator.

Second Invention

Method for Producing Ultra-High-Molecular-Weight Polyethylene Film

The second invention relates to a method for producing an ultra-high-molecular-weight polyethylene film including: a step of molding a film using an ultra-high-molecular-weight polyethylene raw material; and a step of biaxially stretching the film obtained in the above step, in X-axis and Y-axis directions in a temperature range of from a melting point of the film to 180° C., in which the film-molding step includes at least two steps of a press-molding step and a roll-molding step.

In the method for producing an ultra-high-molecular-weight polyethylene film according to the present invention, first, a film is molded using an ultra-high-molecular-weight polyethylene as a raw material. Regarding the raw material and the polymerization catalyst of ultra-high-molecular-weight polyethylene which is used for molding a film, those which are the same as those of the first invention can be used.

The film is molded from an ultra-high-molecular-weight polyethylene by performing both of press-molding and roll-molding. Preferable conditions of press-molding and roll-molding are the same as those of the first invention.

When a film is molded, it is preferable that the roll-molding and press-molding of an ultra-high-molecular-weight polyethylene powder as a raw material are performed at a temperature of higher than a melting point of the ultra-high-molecular-weight polyethylene. Specifically, it is more preferable that roll-molding and press-molding are performed at a temperature of 120° C. to 250° C. Any one of roll-molding and press-molding may be performed first, and roll-molding and press-molding may be repeated. However, it is preferable that roll-molding, is performed in a range of from 120° C. to 180° C. and then press-molding is performed in a range of from 130° C. to 250° C. However, as described below in the examples of the present application, a method is preferable in which roll-molding is performed to mold a film; the film is cut into plural sheets of films; and these films are stacked so as to have rolled-directions different from each other, and then press-molded. By performing both of press-molding and roll-molding in this order, a more uniform film can be molded; and by further performing a stretching treatment described below, a thin film having a superior gas barrier property can be obtained.

Next, in the method for producing an ultra-high-molecular-weight polyethylene film according to the present invention, the molded polyethylene film is biaxially stretched in X-axis and Y-axis directions at a temperature of a melting point thereof or higher. As the biaxial stretching, sequential biaxial stretching, in which the film is stretched in one direction (X-axis) and then is stretched in a direction (Y-axis) perpendicular to the previous direction, may be performed, but simultaneous biaxial stretching in which the film is stretched in X-axis and Y-axis directions (longitudinal and transverse directions) at the same time is preferable.

In the biaxial stretching treatment, the temperature range is greater than or equal to a melting point of the ultra-high-molecular-weight polyethylene film and less than or equal to 180° C., and is preferably 120° C. to 180° C., more preferably 130° C. to 180° C., still more preferably 136° C. to 180° C., and most preferably 136° C. to 170° C. The temperature may be changed during the biaxial stretching treatment within the above-described temperature range.

It is preferable that the stretch ratio during biaxial stretching is 2 times to 50 times the length before stretching in the X-axis and Y-axis directions. The stretch ratios in the X-axis and Y-axis directions may be the same as or different from each other.

In addition, before the biaxial stretching treatment, a maintaining step of maintaining the film at the temperature for performing biaxial stretching for a predetermined time may be provided. At this time, the time for which the temperature is maintained is preferably 1 minute to 180 minutes and more preferably 1 minute to 10 minutes.

In order to efficiently perform biaxial stretching in a state where the film is melted, it is preferable that stretching is performed in a state where only the center of the film is melted and chuck portions (film end portions) are not melted using a biaxial stretching machine equipped with a hot-air blower. At this time, in order to confirm that biaxial stretching is performed in a state where the film is melted, it is preferable that a biaxial stretching machine provided with a stress detection mechanism is used. In addition, the thickness of the chuck portions (film end portions) become gradually thinner and the film is likely to slip along with the progress of stretching. Therefore, it is preferable that a chuck mechanism such as an air chuck mechanism in which a constant holding force is applied is provided.

By biaxially stretching the film obtained by performing both of roll-molding and press-molding, a thin film having superior gas barrier characteristics can be obtained.

In the method for producing an ultra-high-molecular-weight polyethylene film according to the present invention, a shrinking treatment (returning treatment) may be performed along at least one axis of the X-axis or Y-axis after performing biaxial stretching. The shrinking treatment may be performed immediately after performing biaxial stretching. Or, after performing biaxial stretching, the shrinking treatment may be performed after maintaining the film at the temperature for performing the shrinking treatment for a predetermined time (preferably for 1 minute to 180 minutes and more preferably for 1 minute to 10 minutes). The temperature of the shrinking treatment is preferably 120° C. to 180° C., more preferably 136° C. to 180° C., still more preferably 140° C. to 165° C., and most preferably 140° C. to 155° C. The temperature may be changed during the shrinking treatment within the above-described temperature range.

When the shrinking treatment is performed along both of the X-axis and Y-axis, first, shrinking may be performed in one direction, and then shrinking may be performed in a direction perpendicular to the direction. However, it is preferable that shrinking is performed in both the X-axis and Y-axis directions at the same time.

The shrinkage ratio is set such that the length after shrinking is preferably 5% to 95% and more preferably 20% to 75% of the length before shrinking in the X-axis and Y-axis directions. The shrinkage ratios in the X-axis and Y-axis directions may be the same as or different from each other.

In addition, before the shrinking treatment, a maintaining step of maintaining the film at the temperature for performing the shrinking treatment for a predetermined time may be provided. At this time, the time for which the temperature is maintained is preferably 1 minute to 180 minutes and more preferably 1 minute to 10 minutes.

Furthermore, an annealing treatment step of performing annealing treatment may be provided before or after the shrinking treatment. The annealing treatment temperature is preferably 80° C. to 180° C. and more preferably 120° C. to 165° C. The annealing treatment time is preferably 1 minute to 180 minutes and more preferably 1 minute to 10 minutes. The temperature may be changed during the annealing treatment within the above-described temperature range.

In the method for producing an ultra-high-molecular-weight polyethylene film according to the present invention, after performing the biaxial stretching treatment, the annealing treatment may be performed without performing the shrinking treatment. At this time, the annealing treatment time is preferably 1 minute to 180 minutes and more preferably 1 minute to 10 minutes. In addition, the annealing treatment temperature is preferably 80° C. to 180° C. and more preferably 120° C. to 165° C.

In the method for producing an ultra-high-molecular-weight polyethylene film according to the present invention, after performing the shrinking treatment, a restretching treatment may be further performed along at least one axis of the X-axis or Y-axis. The restretching treatment may be performed immediately after the shrinking treatment, or the restretching treatment may be performed after performing the shrinking treatment and then performing a step (annealing treatment step) of maintaining the film at a temperature higher than a final taking-out temperature (normally, room temperature) of the film for a predetermined time (preferably 1 minute to 180 minutes and more preferably 1 minute to 10 minutes). Similarly to the case of the initial biaxial stretching treatment, the temperature of the restretching treatment may also be a temperature of higher than the melting point of the ultra-high-molecular-weight polyethylene film, but is preferably 120° C. to 180° C., more preferably 130° C. to 180° C., still more preferably 136° C. to 180° C., and most preferably 136° C. to 170° C. The temperature may be changed during the restretching treatment within the above-described temperature range.

When the restretching treatment is performed along both the X-axis and the Y-axis, stretching may be performed in one direction first, and then stretching may be performed in a direction perpendicular to the direction, but it is preferable that stretching is performed in the X-axis and Y-axis directions at the same time.

It is preferable that the stretch ratio during restretching is 1.1 times to 50 times the length before restretching in the X-axis and Y-axis directions. The stretch ratios in the X-axis and Y-axis directions may be the same as or different from each other.

Before the restretching treatment, a maintaining step of maintaining the film at the stretching temperature for a predetermined time may be provided. At this time, the time for which the temperature is maintained is preferably 1 minute to 180 minutes and more preferably 1 minute to 10 minutes.

Due to the restretching treatment, the tensile strength at break of the film can be further increased.

In addition, after such a restretching treatment, the above-described shrinking or annealing treatment may be further performed. Furthermore, the stretching treatment, the shrinking treatment, the annealing treatment, and the restretching treatment may be appropriately repeated. The order and the number of times of these treatments may be arbitrarily changed.

By using the method for producing an ultra-high-molecular-weight polyethylene film according to the present invention, an ultra-high-molecular-weight polyethylene film, which has superior physical properties and a thin thickness as described below, can be obtained. That is, the thickness of the ultra-high-molecular-weight polyethylene film, which is obtained using the method according to the present invention, is preferably 0.1 µm to 100 µm and more preferably 0.5 µm to 80 µm.

That is, in the thickness range of from 0.1 µm to 100 µm, the ultra-high-molecular-weight polyethylene film, which is obtained using the method according to the present invention, achieves superior physical properties in which the oxygen permeability coefficient, measured at room temperature, is less than or equal to $5\times10^{-10}$ cm$^3$(STP)cm/(cm$^2$·s·cmHg) and the strength at break is greater than or equal to 30 MPa.

Even when the ultra-high-molecular-weight polyethylene film, which is obtained using the production method according to the present invention, is a thin film having a thickness of 0.1 µm to 60 µm and more preferably 0.5 µm to 40 µm, a superior oxygen barrier property can be obtained in which the oxygen permeability coefficient is less than or equal to $5\times10^{-11}$ cm$^3$(STP)cm/(cm$^2$·s·cmHg) and more preferably less than or equal to $1\times10^{-12}$ cm$^3$(STP)cm/cm$^2$·s·cmHg).

By making the thickness of the films thinner, the films can be stacked with higher density. Therefore, the film according to the present invention can be desirably used as a substrate film for printing, an ink ribbon tape, a magnetic tape substrate, or the like. In addition, the film according to the present invention can be used as a sealing material, a barrier film, or a coating film which is used for an electronic circuit board. In addition, as application forms of these, the film according to the present invention can be used as a packaging material or the like which requires a gas barrier property.

In addition, in the ultra-high-molecular-weight polyethylene film which is obtained using the method according to the present invention, the uniformity is significantly high and the full width at half maximum (FWHM) of a DSC melting peak described below is preferably narrower than 20.0° C., more preferably narrower than 10.0° C., and still more preferably narrower than 6.0° C. The FWHM can be calculated as shown in FIG. 6.

In the second invention, a step of performing a pore-forming treatment to the obtained ultra-high-molecular-weight polyethylene film may be provided. That is, after the step of biaxially stretching, the pore-forming step of stretching the film along at least one axis of the X-axis or the Y-axis to obtain a porous membrane may be further provided.

For example, the film, obtained by being subjected to the stretching treatment and/or the shrinking treatment, can be uniaxially or biaxially stretched in the solid phase (at a temperature lower than or equal to the melting point, preferably at 0° C. to 140° C. and more preferably 20° C. to 130° C.) to form pores, thereby obtaining a porous membrane. Alternatively, the film can be uniaxially or biaxially stretched in the melted state (at a temperature of the melting point or higher, preferably at 140° C. to 180° C. and more preferably 142° C. to 170° C.) to form a porous membrane. As a result, a porous membrane having a pore diameter of several tens of nm can be produced without using an organic solvent.

When the pore-forming treatment is performed, it may be performed after the temperature is temporarily lowered to a temperature lower than or equal to the melting temperature or to the crystallization temperature or lower; or it may be performed while the pore-forming temperature is maintained without lowering the temperature.

It is preferable that the stretch ratio is 1.1 times to 10.0 times the length before the pore-forming treatment in the X-axis and Y-axis directions. When biaxial stretching is performed, it is not necessary that stretching is performed at the same time. Sequential biaxial stretching may be performed. The stretch ratios in the X-axis and Y-axis directions, may be the same as or different from each other. In addition, the temperature may be changed during the pore-forming treatment within the above-described temperature range.

After the pore-forming treatment is performed, the stretching treatment, the shrinking treatment, the annealing treatment, and/or the pore-forming treatment may be appropriately repeated to a degree to which a porous structure is not damaged or blocked. The order and the number of times thereof may be arbitrarily changed. In addition, when the pore-forming treatment is repeated, a cooling treatment of temporarily lowering the temperature to a temperature lower than or equal to the melting temperature or to the crystallization temperature or lower may be performed; or the pore-forming temperature may be maintained without lowering the temperature. By sequentially repeating the step of stretching and the step of shrinking a plurality of times, the mechanical strength and the uniformity of the film can be improved.

In the present invention, it is preferable that a cooling treatment of temporarily cooling the film, which has been subjected to the biaxial stretching treatment and the shrinking treatment, to a temperature lower than or equal to the melting point or to a crystallization temperature or lower, preferably, to a temperature that is lower than a final temperature in the previous step by 10° C. to 160° C., is performed before the pore-forming step and after the step of biaxially stretching and the step of shrinking.

Furthermore, the biaxial stretching treatment, the shrinking treatment, or the annealing treatment may be performed after the cooling treatment or the pore-forming treatment. In addition, the stretching treatment, the shrinking treatment, the annealing treatment, the restretching treatment, the cooling treatment, or the pore-forming treatment may be appropriately repeated. The order and the number of times of the treatments may be arbitrarily changed.

In the present invention, the polyethylene film or the porous membrane, which is obtained by being subjected to such various treatment steps, is finally taken out at room temperature and is used for various applications.

The ultra-high-molecular-weight polyethylene film, which is obtained using the method for producing an ultra-high-molecular-weight polyethylene film according to the present invention, has high tensile strength at break, high tear strength, and practically adequate and well-balanced mechanical properties, and thus can be desirably used for various applications, for example, an adhesive tape, industrial protective tapes or films such as an wear-resistant tape or film, and a scratch-resistant tape; and a barrier film, a water repellent coating film, a packaging film, a lithium ion battery separator, a white reflective film, a neutron blocking film, and a slip sheet of a magnetic tape. In addition, the film can be used as a composite material by being laminated with another polymer film, metal sheet, or the like.

EXAMPLES

Hereinafter, examples of the present invention will be described, but the present invention is not limited to the following examples.

Example 1-1

Roll-Molding

Roll-molding was performed according to JP-A No. 2003-165155 at 145° C. and a rotating speed of rolls of 3 m/min by using polyethylene polymer powder (viscosity average molecular weight: $3.5 \times 10^6$; Hizex Million 340M; manufactured by Mitsui Chemicals Inc.; particle diameter: 150 µm), followed by press-molding under the following conditions.

Press-Molding

Figure 1:
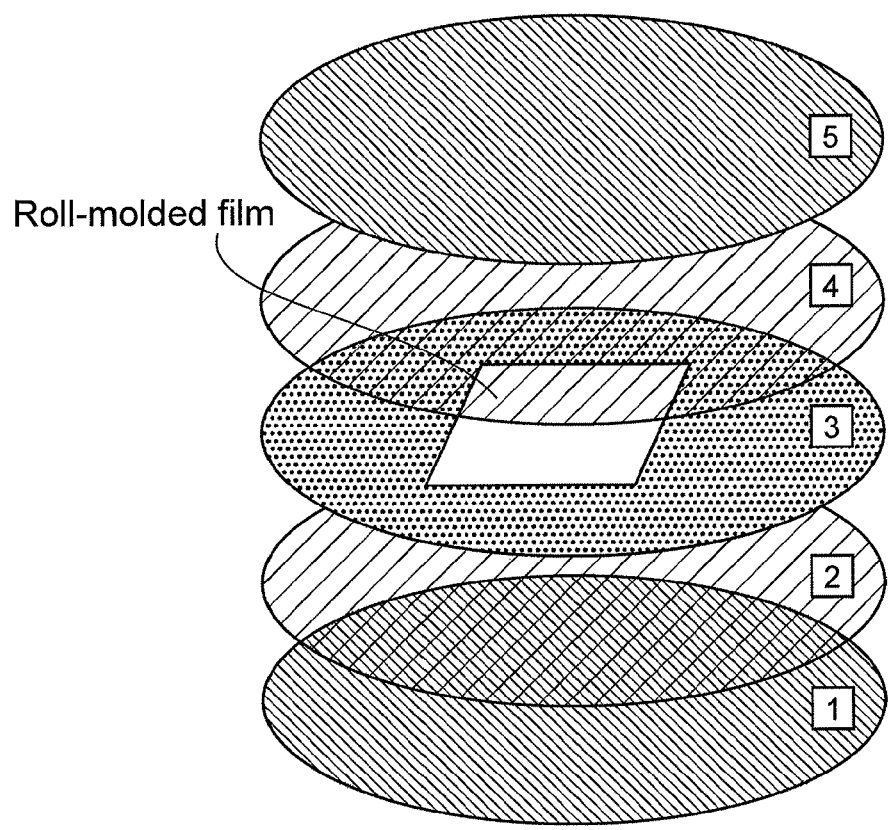
FIG. 1 is a diagram schematically illustrating press-molding.

As illustrated in FIG. 1, a polyimide film (2) for mould-releasing having a thickness of 125 µm was placed on a disk-shaped stainless steel plate (1) having a diameter of 110 mmφ and a thickness of 2 mm; a disk-shaped stainless steel plate (3) having a diameter of 110 mmφ and a thickness of 0.25 mm in which a 70 mm×70 mm rectangular window was cut was placed thereon; four 70 mm×70 mm films, which were cut from the film obtained by roll-molding as described above and having a thickness of about 75 µm, were stacked in the rectangular window so as to have roll directions alternate to (perpendicular to) each other. A polyimide film (4) for mould-releasing having a thickness of 125 µm was placed thereon, and a disk-shaped stainless steel plate (5) having a diameter of 110 mmφ and a thickness of 2 mm was placed thereon.

The whole of these was disposed at room temperature between upper and lower plates of a press machine (manufactured by Baldwin Corporation Inc.) which was installed inside a vacuum chamber, and the pressure was reduced to $10^{-1}$ Torr with a rotary pump. The gap between the upper and lower pressing plates was reduced as much as possible to a degree to which stress was not applied, heating was performed to 180° C., and the temperature was maintained at 180° C. for 5 minutes. Then, pressing was performed at a pressure of 4.5 MPa (at a cylinder pressure of 60 MPa) and then a heater was turned off, followed by slow cooling to room temperature under vacuum. Next the vacuum chamber was opened and the molded film (rolled-pressed film) was taken out.

The film, obtained in this way, was cut into a 25 mm×25 mm square shape (unstretched: 1×1 times). By using a planar expanding stretching machine (manufactured by Island Industry Co., Ltd.) equipped with an air chuck mechanism, the cut film was maintained at 150° C., which was higher than or equal to the melting point thereof, for 5 minutes and simultaneously biaxially stretched to 7×7 times in the longitudinal and transverse directions while maintaining the temperature. Next, "the shrinking treatment" was performed to 4×4 times while maintaining the temperature at 150° C. Furthermore, the film was maintained in this state for 5 minutes to perform an annealing treatment, and cooled to room temperature to fix a lamellar structure. The thickness of the film was 30 µm.

Next, each film was simultaneously biaxially stretched to 1.75×1.75 times (total stretch ratio: 7×7 times) at 130° C., 140° C., 145° C., 150° C., or 155° C. to perform the pore-forming treatment. Then, cooling was performed to room temperature and the film was taken out.

Figure 2:
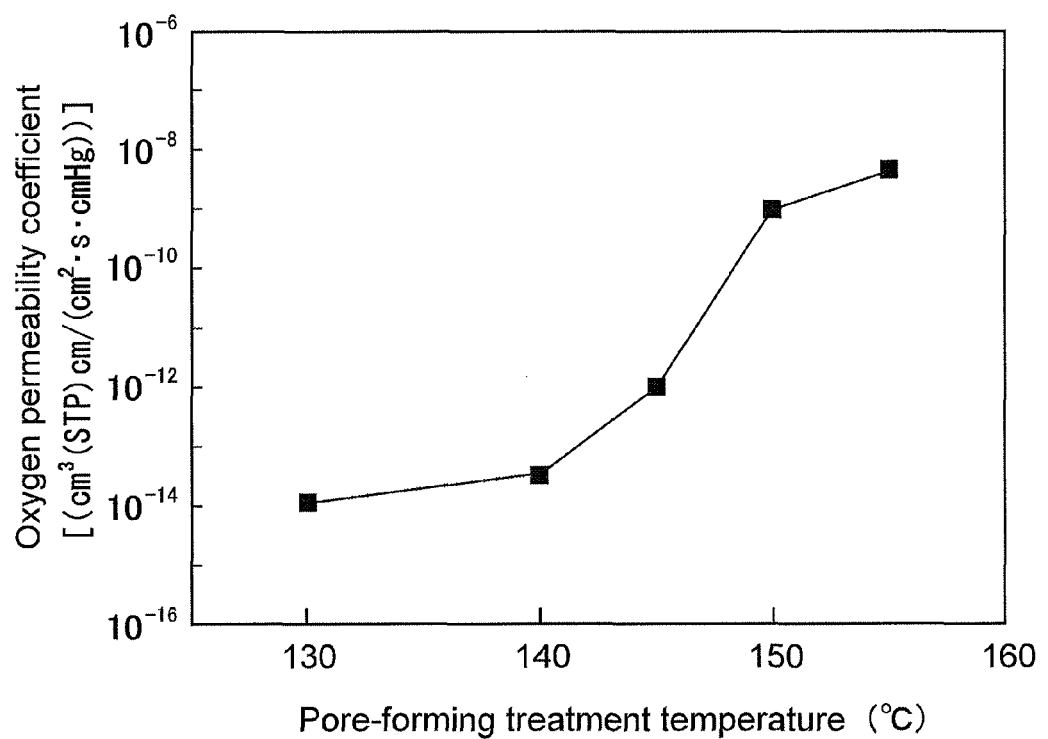
FIG. 2 is a graph illustrating the relationship between a pore-forming treatment temperature and an oxygen permeability coefficient regarding a produced ultra-high-molecular-weight polyethylene porous membrane.

Regarding the obtained polyethylene porous membrane, the oxygen permeability was measured. The results are shown in FIG. 2. It can be seen from FIG. 2 that the oxygen permeability coefficient is significantly improved by performing the pore-forming treatment at 145° C. or higher (the oxygen permeability coefficient of the porous membrane, produced at a pore-forming temperature of 155° C., was $4.72 \times 10^{-9}$ cm$^3$ (STP)cm/(cm$^2$·s·cmHg)). This implies the improvement of the pore-forming efficiency and it can be found that pores having a large diameter are obtained at 145° C. or higher. The oxygen permeability coefficient was measured at room temperature (20° C.) by a modified K-325N machine manufactured by Tsukubarikaseiki K.K.

Figure 3:
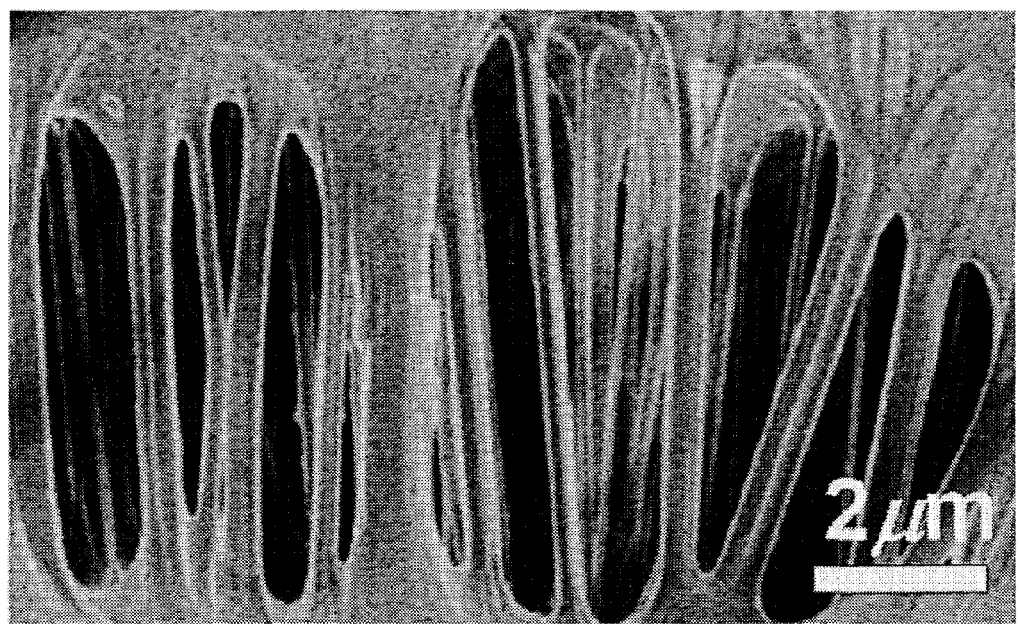
FIG. 3 is a scanning electron microscopic image of an ultra-high-molecular-weight polyethylene porous membrane obtained by being subjected to a pore-forming treatment at 155° C.

FIG. 3 shows a scanning electron microscopic (SEM) image of a porous membrane obtained by being subjected to a pore-forming treatment at 155° C. The SEM observation was performed at room temperature at an accelerating voltage of 1 kV by S-4800 manufactured by Hitachi High-Technologies Corporation. It can be confirmed that slit pores having a length of about 5 μm and a width of about 1 μm were obtained.

Example 1-2

The rolled-pressed film, obtained in the same manner as in Example 1-1, was cut into a 25 mm×25 mm square shape (unstretched: 1×1 times). By using a planar expanding stretching machine (manufactured by Island Industry Co., Ltd.) equipped with an air chuck mechanism, the cut film was maintained at 150° C., which was higher than the melting point thereof, for 5 minutes and simultaneously biaxially stretched to 12×12 times in the longitudinal and transverse directions while maintaining the temperature. Next, "the shrinking treatment" was performed to 6×6 times while maintaining the temperature at 150° C. Furthermore, the film was maintained in this state for 5 minutes to perform an annealing treatment, and was cooled to room temperature to fix a lamellar structure. The thickness of the film was 20 μm.

Next, the film was simultaneously biaxially stretched by 1.75×1.75 times (total stretch ratio: 10.5×10.5 times) at 155° C. to perform the pore-forming treatment, was cooled to room temperature, and was taken out.

The oxygen permeability was $7.10\times10^{-9}$ $cm^3(STP)cm/(cm^2 \cdot s \cdot cmHg)$ when measured at room temperature in the same manner as in Example 1-1.

Example 2-1

A porous membrane was produced in the same manner as in Example 1-1 using the stretched and shrunk film, which was obtained by simultaneously biaxially stretching the film at 150° C. to 7×7 times; shrinking the film to 4×4 times while maintaining the temperature at 150° C.; annealing the film at 150° C.; and cooling the film to room temperature, except that sequential stretching was performed at 155° C. as the pore-forming step by stretching. In the sequential biaxial stretching which was a pore-forming step, stretching was performed by 1.75 times in the longitudinal direction while fixing the film in the transverse direction, and then stretching was performed by 1.75 times in the transverse direction (total stretch ratio: 7×7 times). The oxygen permeability coefficient of the obtained porous membrane was $2.73\times10^{-9}$ $cm^3(STP)cm/(cm^2 \cdot s \cdot cmHg)$ when measured in the same manner as in Example 1-1.

Example 2-2

A porous membrane was produced in the same manner as in Example 1-2 using the stretched and shrunk film, which was obtained by simultaneously biaxially stretching the film at 150° C. to 12×12 times; shrinking the film to 6×6 times while maintaining the temperature at 150° C.; annealing the film at 150° C.; and cooling the film to room temperature, except that sequential stretching was performed at 155° C. as the pore-forming step. In the sequential biaxial stretching which was a pore-forming step, stretching was performed by 1.75 times in the longitudinal direction while fixing the film in the transverse direction, and then stretching was performed by 1.75 times in the transverse direction (total stretch ratio: 10.5×10.5 times). The oxygen permeability coefficient of the obtained porous membrane was $4.10\times10^{-9}$ $cm^3(STP)cm/(cm^2 \cdot s \cdot cmHg)$ when measured in the same manner as in Example 1-1.

(A) of FIG. 4 shows an SEM image of the porous membrane obtained in Example 2-2. It can be confirmed that slit pores having a length of about 6 μm and a width of about 2 μm were obtained.

Example 2-3

A porous membrane was produced in the same manner as in Example 2-2, except that the stretch ratio in the pore-forming treatment was set to 2.0 times (total stretch ratio: 12×12 times). The oxygen permeability coefficient of the obtained porous membrane was $2.50\times10^{-8}$ $cm^3(STP)cm/(cm^2 \cdot s \cdot cmHg)$ when measured in the same manner as in Example 1-1.

(B) of FIG. 4 shows an SEM image of the porous membrane obtained in Example 2-3. It can be confirmed that slit pores having a length of about 7 μm and a width of about 1 μm were obtained.

Example 3-1

A porous membrane was produced in the same manner as in Example 2-1 using the stretched and shrunk film, which was obtained by simultaneously biaxially stretching the film at 150° C. to 7×7 times; shrinking the film to 4×4 times while maintaining the temperature at 150° C.; annealing the film at 150° C.; and cooling the film to room temperature, except that the stretch ratio in the pore-forming treatment was set to 1.5×1.5 times (total stretch ratio: 6×6 times). The oxygen permeability coefficient of the obtained porous membrane was $1.68\times10^{-9}$ $cm^3(STP)cm/(cm^2 \cdot s \cdot cmHg)$ when measured in the same manner as in Example 1-1.

Example 3-2

A porous membrane was produced in the same manner as in Example 2-2 using the stretched and shrunk film, which was obtained by simultaneously biaxially stretching the film at 150° C. to 12×12 times; shrinking the film to 6×6 times while maintaining the temperature at 150° C.; annealing the film at 150° C.; and cooling the film to room temperature, except that the stretch ratio in the pore-forming treatment was set to 1.5×1.5 times (total stretch ratio: 9×9 times). The oxygen permeability coefficient of the obtained porous membrane was $2.52\times10^{-9}$ $cm^3(STP)cm/(cm^2 \cdot s \cdot cmHg)$ when measured in the same manner as in Example 1-1.

(C) of FIG. 4 shows an SEM image of the porous membrane obtained in Example 3-2. It can be confirmed that slit pores having a length of about 4 μm and a width of about 2 μm were obtained.

Example 4-1

Roll-molding and press-molding were performed in the same manner as in Example 1-1. However, in order to adjust the film thickness during press-molding, the thickness of the disk-shaped stainless steel plate (3) of FIG. 1 having a diameter of 110 mmϕ in which a 70 mm×70 mm rectangular window was cut was changed to 0.1 mm, 0.25 mm (the same thickness as that of Example 1-1), 0.5 mm, and 1.0 mm; and the number of 70 mm×70 mm films, which were cut from the film obtained by roll-molding as described above and having a thickness of about 75 μm, and were stacked in the rectangular window, was changed to 2, 4 (the same as that of Example 1), 8, and 16. The obtained molded film (rolled-pressed film) was maintained for 150° C. for 5 minutes, was simultaneously biaxially stretched to 8×8 times in the longitudinal and transverse directions while maintaining the temperature at 150° C., was cooled to room temperature, and was taken out. The film which was finally obtained was referred to as "rolled-pressed-stretched film".

In order to obtain another sample, the film after being subjected to roll-molding and press-molding was maintained at 150° C. for 5 minutes, was simultaneously biaxially stretched in the longitudinal and transverse directions to 7×7 times while maintaining the temperature at 150° C., and was shrunk to 4×4 times in the longitudinal and transverse directions while maintaining the temperature at 150° C. Furthermore, the film was maintained in this state for 5 minutes to perform an annealing treatment, was cooled to room temperature, and was taken out. The film which was finally obtained was referred to as "rolled-pressed-stretched-relaxed film".

Comparative Example 1

A molded film (pressed film) was produced in the same manner as in Example 4, except that 0.7 g to 10.0 g of ultra-high-molecular-weight polyethylene (UHMW-PE) powder (Hizex Million 340M; manufactured by Mitsui Chemicals Inc.; particle diameter: 150 µm) having a viscosity average molecular weight of $3.5 \times 10^6$ was placed in the rectangular window of (3) of FIG. 1 to perform press-molding, instead of stacking 2 to 16 films which were obtained by roll-molding and had a thickness of about 75 µm. The obtained film was maintained at 150° C. for 5 minutes and was simultaneously biaxially stretched to 4×4 times in the longitudinal and transverse directions while maintaining the temperature at 150° C. The film which was finally obtained was referred to as "pressed-stretched film".

In order to obtain another sample, the film was simultaneously biaxially stretched in the longitudinal and transverse directions to 7×7 times at 150° C., was maintained at 150° C. for 5 minutes, and was shrunk to 4×4 times in the longitudinal and transverse directions at 150° C. Furthermore, the film was maintained in this state for 5 minutes to perform an annealing treatment, cooled to room temperature, and was taken out. The film which was finally obtained was referred to as "pressed-stretched-relaxed film".

Regarding the obtained film, the relationship between the film thickness and the oxygen permeability coefficient was investigated. The results are shown in FIG. 5. As a result, the rolled-pressed-stretched film (8×8 times) and the rolled-pressed-stretched-relaxed film (4×4 times) showed a low oxygen permeability coefficient of the order of $10^{-14}$ (unit: $cm^3(STP)cm/(cm^2 \cdot s \cdot cmHg)$). It can be seen from these results that the gas barrier property of an ultra-high-molecular-weight polyethylene film can be improved by performing both roll-molding and press-molding. In addition, even when the rolled-pressed-stretched film is an ultra-thin film having a thickness of 15 an extremely low oxygen permeability coefficient of $8.69 \times 10^{-15}$ $cm^3(STP)cm/(cm^2 \cdot s \cdot cmHg)$ can be obtained. Furthermore, even when the rolled-pressed-stretched film is an ultra-thin film having a thickness of 8 µm, an extremely low oxygen permeability coefficient of $1.19 \times 10^{-14}$ $cm^3(STP)cm/(cm^2 \cdot s \cdot cmHg)$ can be obtained. As a result, according to the invention, even when the thickness of the film is extremely thin, an ultra-high-molecular-weight polyethylene film having a superior gas barrier property is obtained.

Mechanical Strength

Regarding these films, the tensile strength at break and the tear strength were measured. These mechanical properties were measured at room temperature using RTC-1325A manufactured by Baldwin Corporation Inc. Among these, in the measurement of the tensile strength at break, a film was cut into strip-shaped (linear portion of specimen: 30.0 mm, width: 5 mm) specimens for a test. The maximum stress of the stress chart recorded at a tensile speed of 20 min/min was divided by the film cross-sectional area, and a value thereof was referred to as the tensile strength at break. Meanwhile, in the measurement of the tear strength, a 20 mm notch was formed in the longitudinal direction of a strip having a width of 25 mm and a length of 40 mm. Handles at both sides were connected to RTC-1325A and the tearing test was performed at a tearing speed of 200 min/min. The maximum stress of the stress chart recorded by a stress detection cell, which was mounted onto a testing machine, was divided by the film thickness, and a value thereof was referred to as the tear strength.

As a result, regarding the rolled-pressed-stretched film (thickness 15 µm) of 8×8 times obtained in Example 4-1, the tensile strength at break was 93 MPa.

In addition, regarding the rolled-pressed-stretched-relaxed film (thickness 30 µm) of 4×4 times obtained in Example 4-1, the tensile strength at break was 47 MPa and the tear strength was 15 N/mm.

On the other hand, regarding the pressed-stretched film (thickness: 104 µm) of 4×4 times obtained in Comparative Example 1, the tensile strength at break was 23 MPa and the tear strength was 9.8 N/mm.

In addition, regarding the pressed-stretched-relaxed film (thickness: 56 µm) of 4×4 times obtained in Comparative Example 1, the tensile strength at break was 42.5 MPa.

It can be seen from these results that an ultra-high-molecular-weight polyethylene film having high strength can be produced by performing both roll-molding and press molding to mold a film and biaxially stretching the film at a temperature higher than a melting point of the film.

Melting Peak Width

The rolled-pressed-stretched-relaxed film (thickness 30 µm) of 4×4 times obtained in Example 4-1 was heated from 50° C. to 180° C. at a rate of temperature rise of 10° C./min by a DSC (manufactured by PerkinElmer, Inc., Diamond DSC, aluminum pan). The temperature and heat flow were calibrated with standard materials (indium and tin). As a result, the melting peak temperature was 133.5° C. In addition, the full width at half maximum (FWHM) of the melting peak measured as shown in FIG. 6 was 4.95° C. In the melting peak temperature, the FWHM represents a width of the melting peak at a height which is accurately half the height from the base line to the peak top, and is an index indicating the spread of the melting peak. The shape of the melting peak of polyethylene reflects the crystal thickness distribution (Kobunshi Ronbunshuu, vol. 58, no. 7, pp. 326-331 (2001)), and it is known that a narrower melting peak represents a narrower size distribution of the crystal thickness.

Example 4-2

Roll-molding and press-molding were performed in the same manner as in Example 4-1. The obtained molded film was maintained at 150° C. for 5 minutes, was simultaneously biaxially stretched to 14×14 times in the longitudinal and transverse directions while maintaining the temperature at 150° C., was cooled to room temperature, and was taken out.

In order to obtain another sample, the film after being subjected to roll-molding and press-molding was maintained at 150° C. for 5 minutes, was simultaneously biaxially stretched in the longitudinal and transverse directions to 12×12 times while maintaining the temperature at 150° C., and was shrunk to 6×6 times in the longitudinal and transverse directions while maintaining the temperature at 150° C. Furthermore, the film was maintained in this state for 5 minutes to perform an annealing treatment, was cooled to room temperature, and taken out.

The oxygen permeability coefficient of these films was measured at room temperature in the same manner as in Example 4-1. As a result, regarding the rolled-pressed-stretched film of 14×14 times (thickness: 9 μm), an oxygen permeability coefficient of $1.34 \times 10^{-14}$ $cm^3(STP)cm/(cm^2 \cdot s \cdot cmHg)$ was obtained. In addition, regarding the rolled-pressed-stretched-relaxed film of 6×6 times (thickness: 20 μm), an oxygen permeability coefficient of $2.88 \times 10^{-14}$ $cm^3(STP)cm/(cm^2 \cdot s \cdot cmHg)$ was obtained.

The mechanical properties of these films were measured in the same manner as in Example 4-1. As a result, regarding the rolled-pressed-stretched film of 14×14 times (thickness: 9 μm), the tensile strength at break was 116 MPa. In addition, regarding the rolled-pressed-stretched-relaxed film of 6×6 times (thickness: 20 μm), the tensile strength at break was 71 MPa and the tear strength was 13 N/mm.

These films were measured by a DSC in the same manner as in Example 4-1.

FIG. 8 is a diagram illustrating a DSC melting curve of the rolled-pressed-stretched-relaxed film (A) of Example 4-2 with a stretch ratio of 6×6 times; and DSC melting curves of a rolled-pressed-stretched film (B) with a stretch ratio of 14×14 times and an unstretched rolled-pressed film (C) which were obtained under the same DSC measurement conditions.

As a result, regarding the rolled-pressed-stretched film (B) which was biaxially stretched to a high stretch ratio (14×14 times) at 150° C. in the melted state, a main peak near 136° C. caused by melting of lamellar crystals and a subsidiary peak near 155° C. caused by melting of extended chain crystals were clearly observed. On the other hand, in the rolled-pressed-stretched-relaxed film (6×6 times) (A), when compared to the rolled-pressed-stretched film (B), the melting peak of lamellar crystals is sharper and greater. In addition, the high-temperature side peak is significantly smaller. The FWHM of the rolled-pressed-stretched-relaxed film (6×6 times) was 4.80° C. (the melting peak temperature was 133° C.) when measured in the same manner as in Example 4-1. The melting peak temperature of the unstretched rolled-pressed film (C) was 137° C. Therefore, 150° C., which is the temperature for the biaxial stretching and relaxing treatments in Examples 4-1 and 4-2, is higher than the melting point of the rolled-pressed film, and it is obvious that the film was stretched and relaxed in the melted state.

The FWHM of the pressed-stretched-relaxed film with a stretch ratio of 4×4 times obtained in Comparative Example 1 was 5.05° C. (the melting peak temperature was 132° C.) when measured in the same manner as in the above-described rolled-pressed-stretched-relaxed film. It can be seen from these results that an ultra-high-molecular-weight polyethylene film having a narrower lamellar thickness distribution can be produced by performing both roll-molding and press-molding to mold a film and biaxially stretching the film at a temperature higher than or equal to a melting point of the film.

A SEM image of the rolled-pressed-stretched-relaxed film (4×4 times) obtained in Example 4-1 is shown in (A) of FIG. 7. A uniform lamellar structure was observed and it can be confirmed that structure defects such as cracks were not generated in the film surface.

Example 4-3

In addition, a rolled-pressed-relaxed film (4×4 times) was cooled to 25° C. and was simultaneously biaxially stretched at 120° C. by 1.75×1.75 times (total stretch ratio: 7×7 times) to perform the pore-forming treatment. A SEM image of a porous membrane obtained at this time is shown in (B) of FIG. 7. As a result, many pores having a small size were obtained. These results show that, by applying stress to a uniform lamellar structure, amorphous chains trapped between crystals were selectively deformed, gaps between crystals, were increased, and thus a nanoporous structure was obtained.

In addition, (A) and (B) of FIG. 9 show SEM images of the rolled-pressed-stretched film with a stretch ratio of 14×14 times and the rolled-pressed-stretched-relaxed film with a stretch ratio of 6×6 times which were obtained in Example 4-2. In the rolled-pressed-stretched-relaxed film (B) with a stretch ratio of 6×6 times, a lamellar structure was mainly observed. However, in the rolled-pressed-stretched film (A) with a stretch ratio of 14×14 times, a fibril-like structure (linear structure extending from the upper left to the lower right) assigned to extended chain crystals was also observed. The coexistence of two kinds of structures matches the results of the DSC measurement of FIG. 8.

On the other hand, (A) to (C) of FIG. 10 show SEM images of the pressed-stretched film with a stretch ratio of 4×4 times obtained in Comparative Example 1, a pressed-stretched film with a stretch ratio of 8×8 times obtained in the same manner as Comparative Example 1, and the pressed-stretched-relaxed film with a stretch ratio of 4×4 times obtained in Comparative Example 1. It can be seen that the uniformity of a film structure is inferior to that of the rolled-pressed-stretched films and the rolled-pressed-stretched-relaxed film (FIG. 9 and (A) of FIG. 7) of Examples 4-1 and 4-2. It can be seen from these results that an ultra-high-molecular-weight polyethylene film having high structural uniformity can be produced by performing both roll-molding and press-molding to mold a film and biaxially stretching the film at a temperature higher than or equal to a melting point of the film.

Example 5-1

The rolled-pressed-stretched-relaxed film (thickness: 30 μm) of 4×4 times obtained in Example 4-1 was subjected to the pore-forming treatment. As pore-forming treatment conditions, sequential biaxial stretching was performed at 100° C. by 1.75×1.75 times (total stretch ratio: 7×7 times) to produce a porous membrane. When sequential biaxial stretching was performed in this pore-forming step, stretching was performed by 1.75 times in the longitudinal direction while fixing the film in the transverse direction, and then stretching was performed by 1.75 times in the transverse direction. When a scanning electron microscopic (SEM) image of the obtained porous membrane was imaged and observed, it was confirmed that continuous passing-through pores were formed.

Example 5-2

The rolled-pressed-stretched-relaxed film (thickness: 33 μm) of 6×6 times obtained in Example 4-2 was subjected to the pore-forming treatment. As pore-forming treatment conditions, sequential biaxial stretching was performed at 100° C. by 1.75×1.75 times (total stretch ratio: 10.5×10.5 times) to produce a porous membrane. When sequential biaxial stretching was performed in this pore-forming step, stretching was performed by 1.75 times in the longitudinal direction while fixing the film in the transverse direction, and then stretching was performed by 1.75 times in the transverse direction. When a SEM image of the obtained porous membrane was observed, it was confirmed that continuous passing-through pores were formed.

Example 6-1

The film, obtained by performing roll-molding and press-molding in the same manner as in Example 1-1, was simultaneously biaxially stretched at 150° C. to 7×7 times in the longitudinal and transverse directions, was shrunk at 150° C. to 4×4 times in the longitudinal and transverse directions, was restretched at 150° C. by 1.5 times only in the longitudinal direction while fixing the film in the transverse direction (4 times), was cooled to room temperature. As a result, a film of 6×4 times was obtained. An SEM image of this film is shown in FIG. 11. The longitudinal and transverse directions of the SEM image in FIG. 11 match the longitudinal and transverse directions (6×4) in the stretching and relaxing treatments. It can be seen from this figure that, by temporarily shrinking the film to 4×4 times and then restretching the film by different ratios in the longitudinal and transverse directions, lamellae were uniformly aligned mainly in a direction perpendicular to a direction in which the stretch ratio is larger. The thickness of this film was 25 µm.

The tensile strength at break (in the longitudinal direction) of this film was 70 MPa. In addition, the tear strength (in the longitudinal direction) was 10 N/mm.

By using the above-described planar expanding stretching machine, the above-described film of 6×4 times was stretched at 120° C. by 2 times only in the transverse direction while fixing the film in the longitudinal direction (6 times) to perform the pore-forming treatment. As a result, a porous membrane of 6×8 times was obtained. When an SEM image of the obtained porous membrane was observed, it was confirmed that continuous passing-through pores were formed.

Example 6-2

The film, obtained by performing roll-molding and press-molding in the same manner as in Example 1-1, was simultaneously biaxially stretched at 150° C. to 12×12 times in the longitudinal and, transverse directions, was shrunk at 150° C. to 6×6 times, was restretched at 150° C. by 1.5 times only in the longitudinal direction while fixing the film in the transverse direction (6 times), and was cooled to room temperature. As a result, a film of 9×6 times was obtained. The thickness of this film was 15 µm.

The tensile strength at break (in the longitudinal direction) of this film was 110 MPa. In addition, the tear strength (in the longitudinal direction) was 8 N/mm.

By using the above-described planar expanding stretching machine, the above-described film of 9×6 times was stretched at 120° C. by 2 times only in the transverse direction while fixing the film in the longitudinal direction (9 times) to perform the pore-forming treatment. As a result, a porous membrane of 9×12 times was obtained. When an SEM image of the obtained porous membrane was observed, it was confirmed that continuous passing-through pores were formed.

Example 7

Roll-molding and press-molding was performed in the same manner as in Example 4-2 to obtain a film, except that the pressing temperature was set to 160° C. In the same manner as in Example 4-2, the obtained film was maintained at 150° C. for 5 minutes, was simultaneously biaxially stretched to 12×12 times in the longitudinal and transverse directions while maintaining the temperature at 150° C., and was shrunk to 6×6 times while maintaining the temperature at 150° C. Furthermore, the film was maintained in this state for 5 minutes to perform an annealing treatment, and was cooled to room temperature. As a result, a rolled-pressed-stretched-relaxed film was produced.

The tensile strength at break of this rolled-pressed-stretched-relaxed film (stretch ratio: 6×6 times) was 40 MPa when measured in the same manner as in Example 4-2. In addition, the tear strength was 25 N/mm.

Example 8

The film, obtained by performing roll-molding and press-molding in the same manner as in Example 4-2, was simultaneously biaxially stretched at 140° C. to 4×4 times in the longitudinal and transverse directions, was shrunk at 150° C. to 2×2 times, was simultaneously biaxially stretched again at 150° C. to 14×14 times, and was cooled to room temperature. Then, the film was taken out.

The tensile strength at break of this film (stretch ratio: 14×14 times) was 175 MPa when measured in the same manner as in Example 4-2. It can be seen from these results that the film strength can be improved by repeating the stretching treatment.

Example 9-1

The film, obtained by performing roll-molding and press-molding in the same manner as in Example 4-2, was simultaneously biaxially stretched at 140° C. to 3×3 times in the longitudinal and transverse directions, was shrunk at 140° C. to 2×2 times, and was annealed at this temperature for 5 minutes. Furthermore, the film was simultaneously biaxially stretched again at 150° C. to 12×12 times, was annealed at this temperature for 5 minutes, and was cooled to room temperature. Then the film was taken out.

The tensile strength at break of this film (stretch ratio: 12×12 times) was 120 MPa when measured in the same manner as in Example 4-2.

It can be seen from Examples 7 to 9-1 that the physical properties of the obtained film are improved by repeating the respective treatment steps.

Example 9-2

The film, obtained by performing roll-molding and press-molding in the same manner as in Example 4-2, was maintained at 150° C. for 5 minutes and was simultaneously biaxially stretched to 6×6 times in the longitudinal and transverse directions while maintaining the temperature at 150° C. The film was maintained in this state for 5 minutes to perform an annealing treatment, was cooled to room temperature, and was taken out.

The tensile strength at break of this rolled-pressed-stretched film (stretch ratio: 6×6 times) was 31 MPa when measured in the same manner as in Example 4-2.

Example 10

Roll-molding and press-molding were performed to obtain a film in the same manner as in Example 9-2, except that ultra-high-molecular-weight polyethylene polymer powder, which had a viscosity average molecular weight of $1 \times 10^7$ and was synthesized using a Ziegler-based catalyst, was used as a raw material. In the same manner as in Example 9-2, the obtained film was maintained at 150° C. for 5 minutes and was simultaneously biaxially stretched to 6×6 times in the longitudinal and transverse directions while maintaining the temperature at 150° C. The film was maintained in this state for 5 minutes to perform an annealing treatment, and was cooled to room temperature to produce a film.

The tensile strength at break of this film (stretch ratio: 6×6 times) was 90 MPa when measured in the same manner as in Example 9-2.

This value is significantly greater than the value of the tensile strength at break of the above-described rolled-pressed-stretched film (stretch ratio 6×6 times) obtained in Example 9-2; and implies that the physical properties of the obtained film was improved due to an increase in the molecular weight of the polyethylene as the raw material.

Example 11

A film with a stretch ratio of 6×6 times was produced in the same manner as in Example 10, except that ultra-high-molecular-weight polyethylene polymer powder, which had a viscosity average molecular weight of $1 \times 10^7$ and was synthesized using a metallocene-based catalyst, was used as a raw material.

The tensile strength at break of this film was measured and was 100 MPa. It is known that the molecular weight distribution of the ultra-high-molecular-weight polyethylene synthesized using the metallocene-based catalyst, was narrower than that of the ultra-high-molecular-weight polyethylene synthesized using the Ziegler-based catalyst. It can be seen that due to such a molecular weight distribution, the strength of the ultra-high-molecular-weight polyethylene film according to the present invention is different.

It can be seen from Examples 10 and 11 that, even when an ultra-high-molecular-weight polyethylene having an extremely high molecular weight of 10,000,000 is used, the superior effects of the present invention are exhibited; and the effects were further improved by increasing the molecular weight and making the molecular weight distribution narrow.

Reference Example 1

The oxygen permeability coefficient of a commercially available ultra-high-molecular-weight polyethylene porous membrane having a thickness of 25 μm ("HiPore", manufactured by Asahi Kasei E-materials Corporation; for use in a lithium ion battery separator) was $1.8 \times 10^{-9}$ cm$^3$(STP)cm/(cm$^2$·s·cmHg) when measured in the same manner as in Example 1. Therefore, it is confirmed that the oxygen permeability of the porous membrane according to the present invention has the same level as or higher level than that of commercially available products.

INDUSTRIAL APPLICABILITY

A porous membrane which is obtained using the method for producing an ultra-high-molecular-weight polyethylene porous membrane according to the present invention has a higher oxygen permeability coefficient than that of the existing lithium ion battery separators. Therefore, ions permeate therethrough more easily and power generation performance is superior. Currently, there is industrially desired high output by winding a separator film along with electrodes with higher tension to be integrated in the manufacturing of stacking lithium ion battery cells. However, in the existing lithium ion batteries, when molding is performed into a flat shape after winding, a membrane is bent and is likely to be broken. On the other hand, when an ultra-high-molecular-weight polyethylene porous membrane, which is molded using the present technique, is used, cell stacks can be highly integrated and higher output can be obtained.

In addition, the membrane can be desirably used in the various fields for a coating film having superior water repellency, a white reflective film, a neutron blocking film, and the like.

In addition, a thin film, which is obtained using the method for producing an ultra-high-molecular-weight polyethylene film according to the present invention, has a superior gas barrier property and high mechanical strength. Therefore, the films higher density. Accordingly, the film can be used as a substrate film for printing, an ink ribbon tape, or a magnetic tape substrate. In addition, the film according to the present invention can be used as a sealing material of an electronic circuit board, a barrier film, a coating film or a packaging film. In addition, the ultra-high-molecular-weight polyethylene has a low coefficient of friction and superior wear resistance. Therefore, the film can be used as a sliding member for copying machines, an air bag for vehicles, a rail sheet for sliding door, or a transport sheet. Furthermore, the film can be desirably used in various fields for a coating film having superior water repellency, a lithium ion battery separator, a white reflective film, a neutron blocking film, various industrial tapes including an adhesive tape and a scratch-resistant tape, and the like. In addition, the film can be used as a composite material by being laminated with another polymer film, metal sheet, or the like.

The disclosure of Japanese Patent Application No. 2010-194264 is incorporated herein by reference in its entirety.

All publications, patent applications, and technical standards mentioned in this specification are herein incorporated by reference to the same extent as if each individual publication, patent application, or technical standard was specifically and individually indicated to be incorporated by reference.

The invention claimed is:

1. A method for producing an ultra-high-molecular-weight polyethylene porous membrane, comprising:
    a step of molding a film using an ultra-high-molecular-weight polyethylene raw material having a viscosity average molecular weight of from 1,000,000 to 12,000,000;
    a step of biaxially stretching the film obtained in the above step, in X-axis and Y-axis directions in a temperature range of from a melting point of the film to 180° C.;
    a step of shrinking the biaxially stretched film obtained in the above step, along at least one axis of the X-axis or Y-axis; and
    a pore-forming step of stretching the shrunk film obtained in the above step, along at least one axis of the X-axis or Y-axis in a temperature range of from 142° C. to 170° C.

2. The method for producing an ultra-high-molecular-weight polyethylene porous membrane according to claim 1, wherein the step of shrinking is performed in a temperature range of from 120° C. to 180° C.

3. The method for producing an ultra-high-molecular-weight polyethylene porous membrane according to claim 1, further comprising a step of annealing the film at a temperature of from 80° C. to 180° C. after the step of biaxially stretching or the step of shrinking.

4. The method for producing an ultra-high-molecular-weight polyethylene porous membrane according to claim 1, comprising a step of cooling the film to a temperature that is lower than a final temperature in a previous step by from 10°

C. to 160° C., before the pore-forming step but after the step of biaxially stretching or the step of shrinking.

5. The method for producing an ultra-high-molecular-weight polyethylene porous membrane according to claim 1, wherein at least one step of the step of biaxially stretching, the step of shrinking, or the pore-forming step is performed a plurality of times in any order of the steps.

6. The method for producing an ultra-high-molecular-weight polyethylene porous membrane according to claim 3, comprising a step of cooling the film to a temperature that is lower than a final temperature in a previous step by from 10° C. to 160° C., before the pore-forming step but after the step of biaxially stretching, the step of shrinking, or the step of annealing.

7. The method for producing an ultra-high-molecular-weight polyethylene porous membrane according to claim 3, wherein at least one step of the step of biaxially stretching, the step of shrinking, the step of annealing, or the pore-forming step is performed a plurality of times in any order of the steps.

* * * * *